US007209808B2

(12) United States Patent
Chase et al.

(10) Patent No.: US 7,209,808 B2
(45) Date of Patent: Apr. 24, 2007

(54) DEVICE AND METHOD FOR DETECTING OPERATION OF MOTOR VEHICLES BY MONITORED INDIVIDUALS

(75) Inventors: Paul A. Chase, Burke, VA (US); Richard P. Dexter, Springfield, VA (US); Nancy F. Wolejsza, Gaithersburg, MD (US); Michael C. Wolejsza, Silver Spring, MD (US); Douglas S. Cameron, Vienna, VA (US); Hanson C. Gaugler, Springfield, VA (US); Debra A. Gross, Springfield, VA (US); Judith A. Pine, Ashburn, VA (US); Wayne K. Murphy, Haymarket, VA (US); David S. Powell, Lake Ridge, VA (US); Edward J. Ohlert, Springfield, VA (US); Darren S. McKnight, Centreville, VA (US); Stephen P. Chase, Ashburn, VA (US)

(73) Assignee: The Titan Corporation, San Diego, CA (US)

( * ) Notice: Subject to any disclaimer, the term of this patent is extended or adjusted under 35 U.S.C. 154(b) by 331 days.

(21) Appl. No.: 10/898,211

(22) Filed: Jul. 26, 2004

(65) Prior Publication Data

US 2005/0137755 A1 Jun. 23, 2005

Related U.S. Application Data

(60) Provisional application No. 60/530,243, filed on Dec. 18, 2003.

(51) Int. Cl.

| | |
|---|---|
| ***G06F 17/00*** | (2006.01) |
| ***G06F 7/04*** | (2006.01) |
| ***B60B 7/16*** | (2006.01) |
| ***B62H 5/00*** | (2006.01) |

(52) U.S. Cl. .......................... 701/1; 701/36; 307/10.2; 340/426.12; 180/287

(58) Field of Classification Search .................... 701/1, 701/36; 307/9.1–10.2; 340/426.1, 428, 340/426.11, 426.12, 5.8, 5.82; 180/287
See application file for complete search history.

(56) References Cited

U.S. PATENT DOCUMENTS

| | | | | |
|---|---|---|---|---|
| 4,897,630 A * | 1/1990 | Nykerk | .................. | 340/426.25 |
| 5,396,215 A | 3/1995 | Hinkle | | |
| 5,448,218 A * | 9/1995 | Espinosa | ............... | 340/426.17 |

(Continued)

FOREIGN PATENT DOCUMENTS

| | | |
|---|---|---|
| DE | 101 54 956 A1 | 5/2003 |

*Primary Examiner*—Y. Beaulieu
(74) *Attorney, Agent, or Firm*—Rothwell, Figg, Ernst & Manbeck

(57) ABSTRACT

A License Sanction Enforcement System™ technology that includes at least one sensor worn by an individual to be monitored and a data storage unit. The sensor can detect directional angle and acceleration motion. The data storage unit is coupled with the sensor and stores the angle kinematic data detected by the sensor. The device determines whether the individual is operating or has operated a motor vehicle based upon analysis of the angle and acceleration data, and creates a record in the data storage unit of each occurrence that operation of a motor vehicle is detected. Alternatively, the data storage unit may be used to store the raw detection data, which can be transferred to an external data processing device for analysis.

39 Claims, 21 Drawing Sheets

U.S. PATENT DOCUMENTS 5,598,140 A * 1/1997 Eizen .................... 340/426.25
6,232,874 B1 5/2001 Murphy
6,373,148 B1 4/2002 Daiss et al.
6,422,595 B1 7/2002 Breed et al.

* cited by examiner

WRIST MOUNTED ALGORITHM

ANKLE MOUNTED ALGORITHM

DEVICE AND METHOD FOR DETECTING OPERATION OF MOTOR VEHICLES BY MONITORED INDIVIDUALS

CROSS-REFERENCE TO RELATED APPLICATIONS

This application claims the benefit of the filing date of provisional application Ser. No. 60/530,243 filed on Dec. 18, 2003, under 35 U.S.C. § 119(e).

BACKGROUND OF THE INVENTION

1. Field of the Invention

The present invention is directed to systems and methods for determining when an individual is operating or has operated a motor vehicle.

2. Description of the Related Art

Upwards of 10 million individuals illegally drive in the United States after their licenses have been administratively suspended or revoked. While illegally driving, these offenders kill thousands of individuals and injure tens of thousands of innocent people each year. Although attempts have been made, at the present time, there is no effective technology to deter and facilitate the apprehension of these illegal drivers.

In 1998 the National Highway Traffic Safety Administration (NHTSA) funded the development of a technology called the Problem Driver Detection System (PDDS), which consists of wrist mounted transmitters for individuals with suspended/revoked licenses. The proposed devices transmit coded signals to roadside police cruisers as the illegal driver is going by, which will cause a picture of the offender to appear on a monitor in the cruiser. The purpose of the PDDS is to deter illegal driving by proactively apprehending individuals driving with suspended/revoked licenses. However, the PDDSs have a number of drawbacks, which have prevented their adoption.

For example, the PDDS system does not distinguish between passengers and drivers wearing the devices. This will result in unacceptable false positive indications that an individual is illegally driving the vehicle. In addition, police will not be able to visually match the picture shown in the monitor in the cruiser with the driver going by in foul weather or at night.

Another drawback of the PDDS is that it requires the installation of dedicated antennas in police cruisers to receive the signals from the wrist mounted sensors. This will require the expense of procurement and installation of the antennas.

The PDDS system also requires the frequent installation/removal of electronic images of offenders in the cruiser's computer memory.

Moreover, the PDDS may be relatively easy to defeat or circumvent by:

(1) Operating the vehicle outside the local jurisdiction where the police cars are modified to receive the signal and where the pictures of the offenders are not loaded in the memory of the computers of the police vehicles;

(2) Blocking, degrading or corrupting the signal from the wrist sensor with shielding material; and (3) Operating the vehicle in known times and circumstances when the PDDS will not work, such as at night and in foul weather.

The PDDS will also fail when police officers in the roadside cruiser are performing other tasks such as making and receiving dispatch calls. The PDDS requires the use of a modified police cruiser and will not work with an officer on roadside patrol on a motorcycle. The PDDS requires dedicated police manpower, which frequently must compete with higher priority police manpower requirements.

Another technology called "Driver-ID," is currently in limited use in the State of Michigan. In this program, the offender wears a court ordered ankle mounted transmitter. The vehicles the offender "might" drive are outfitted with a system called an Ignition Interlock Device (IID) installed under their dashboards. When the IID receives a signal transmitted by the ankle sensor of the individual in the driver's seat, it will disable the vehicle from starting.

Driver-ID technology is in very limited use because it has a number of drawbacks. First, it motivates wearers of the sensors to obtain and drive vehicles without IIDs, which is relatively easy to do. Second, it requires an infrastructure of trained and certified technicians to install and remove the IIDs. Third, it is easy to defeat.

This technology may be defeated or circumvented by:

(1) The offender obtaining and driving vehicles without IIDs;

(2) The offender blocking or degrading the signal from the ankle transmitter with shielding material placed over or around the IID or ankle transmitter; or (3) The offender placing his/her foot in such a manner that the IID falsely determines it is on the passenger's foot and not the driver's foot.

Thus, in view of the above-described deficiencies with the state-of-the-art, there is a need for new and improved technology to deter and facilitate the apprehension of illegal drivers.

SUMMARY OF THE INVENTION

According to an embodiment of the present invention, a driving sensing and signaling device is provided that includes at least one sensor worn by an individual to be monitored and a data storage unit. The sensor can detect the kinematic quantities of position, velocity and acceleration. Specifically, it measures angular velocity and linear acceleration in order to determine linear velocity. The data storage unit is coupled with the sensor and stores the kinematic data detected by the sensor. The device determines whether the individual has operated a motor vehicle based upon analysis of the kinematic data, and can store a record of each occurrence when vehicular operation is detected in the data storage unit.

According to another embodiment of the present invention, a method is provided for determining when an individual is driving a motor vehicle. The method includes a step of measuring movement of at least a hand or foot of an individual. The method also includes a step of determining whether said individual is driving a motor vehicle based on the movement measured in the measuring step. When the individual is determined to be driving in the determining step, at least a date and time of the detected driving is recorded.

According to the present invention, many non-limiting advantages may be achieved over the prior art. For example, the present invention will require an absolute minimum of infrastructure to administer and implement and will not require direct law enforcement intervention. The installation/removal of devices in police cruisers will not be required. The present invention will work in any vehicle and will not require the modification or installation of devices or technology in vehicles the offender might drive. Furthermore, the present invention can distinguish between passengers and drivers wearing the devices.

The present invention is also prohibitively difficult to defeat. First, the sensors can be self-contained and are not required to transmit or to receive signals to or from an outside source. Second, the sensors can operate independently of each other and can detect driving on their own accord. Third, the device is reliable because it can determine when a wearer of the device is driving by detecting and correlating the most basic hand and/or foot motions essential to driving with the most basic and fundamental movements of the vehicle. It is not possible to drive a vehicle very long without turning the steering wheel or stepping on the gas and brake pedals.

BRIEF DESCRIPTION OF THE DRAWINGS

Further applications and advantages of various embodiments of the present invention are discussed below with reference to the following drawing figures.

DETAILED DESCRIPTION OF THE PREFERRED EMBODIMENTS

The present invention includes a novel system and method for monitoring the movements of an individual and analyzing those monitored movements to determine, inter alia, whether the individual has been operating a motor vehicle. The present invention includes a License Sanction Enforcement System (LSES™) which can be worn by individuals to monitor their bodily movements. Preferably, these sensors are rugged, all weather and tamper proof, attractive in appearance, and non-cumbersome, i.e., the wearing of LSES™ sensors should not impair the wearer's normal activities, such as bathing, sleeping and dressing.

The LSES™ can detect when an individual wearing the device is driving by analyzing and processing data to correlate the movements of the individual's feet to and from the gas and brake pedals with the acceleration/deceleration and turns of the vehicle and/or the movements of the individuals' hands with the turning of the vehicle.

Figure 1B:
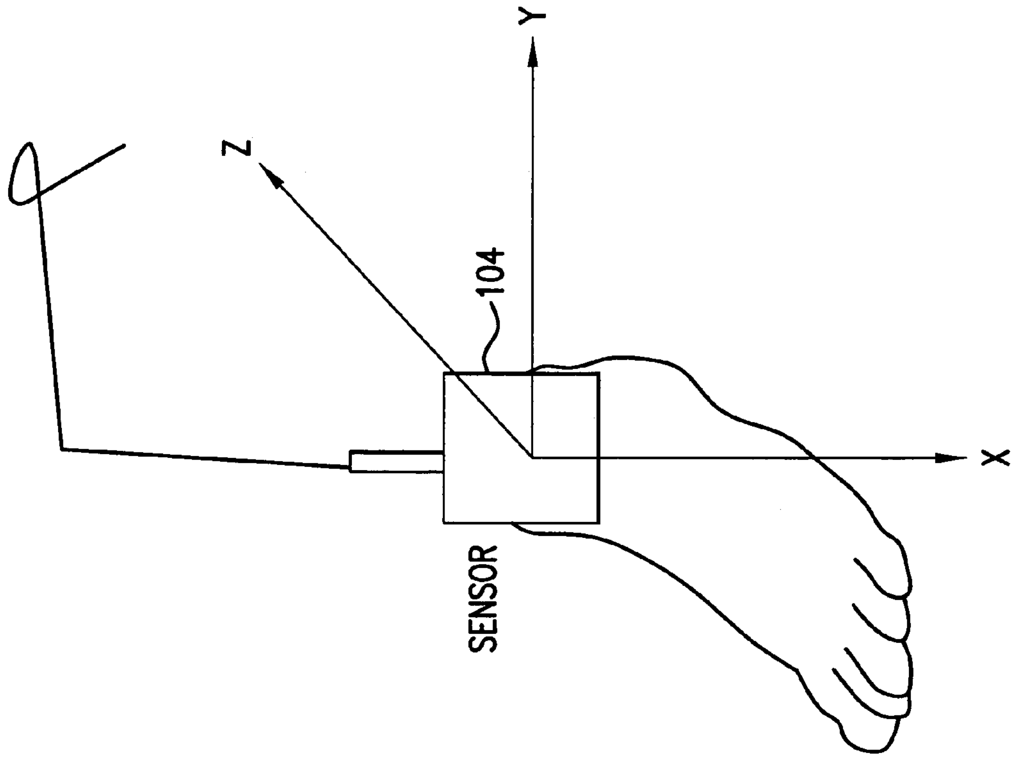
FIGS. 1A–B illustrate an exemplary sensing device and the orientation of hand and ankle sensors when worn on the hand and ankle, respectively, according to an embodiment of the present invention.
Figure 1A:
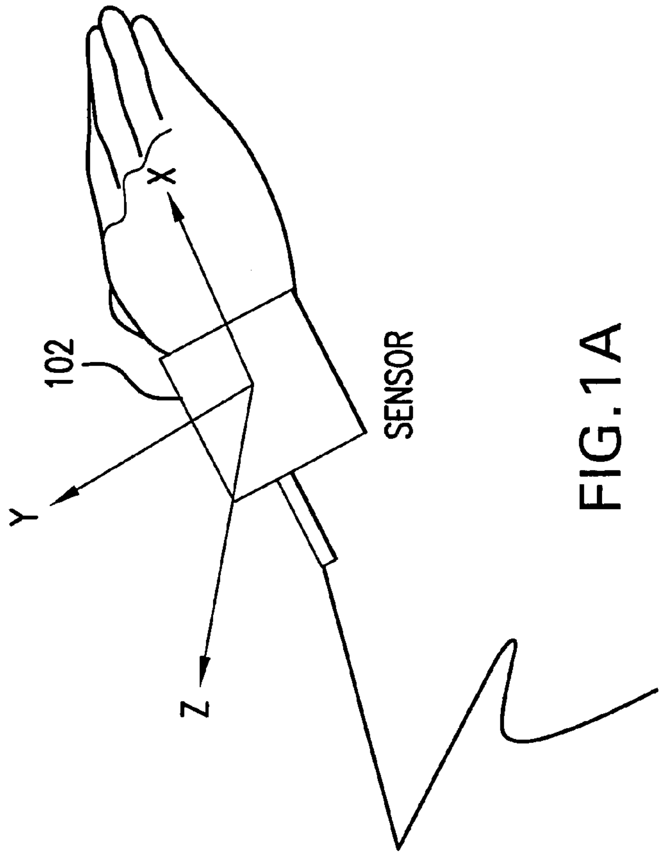
Figure 2:
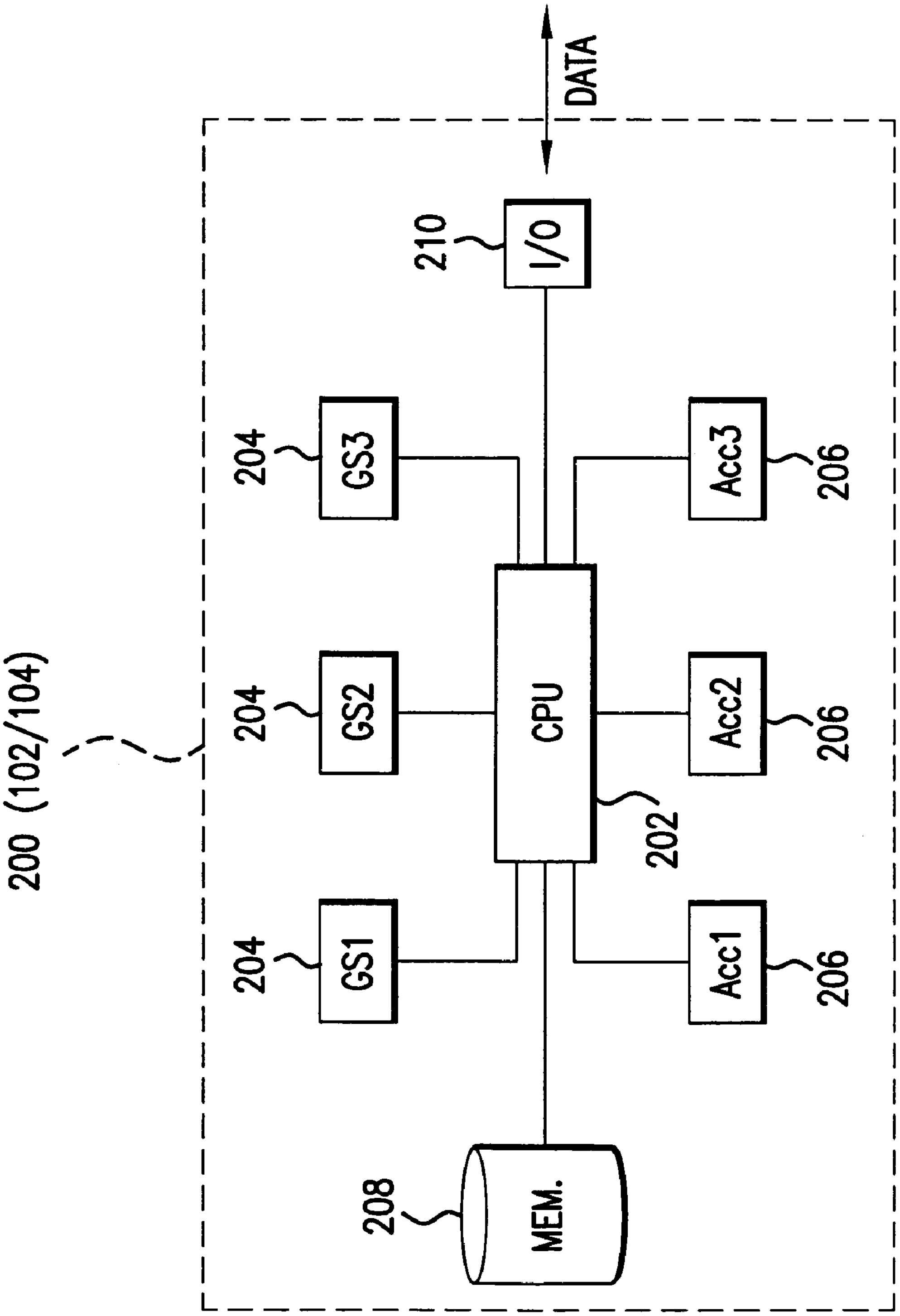
FIG. 2 is a block diagram of an exemplary sensor provided in the sensing device according to an embodiment of the present invention.

Referring to FIGS. 1A–B, wrist sensors 102 and ankle sensors 104 are preferably fastened to an individual's wrists and ankles respectively, by appropriate means. Each of the sensors 102 and 104 may include means for measuring the kinematic data. FIG. 2 is a block diagram of an exemplary sensor 200, which may be used as a wrist sensor 102 or an ankle sensor 104, according to an embodiment of the present invention.

Sensor 200 may include a central processing unit (CPU) 202 coupled with a memory or data storage unit 208 (e.g., EEPROM, SRAM, etc.) for storing measured data, a power supply (not shown), three orthogonal accelerometers 206 and or three orthogonal rate gyroscopes 204, and an input/output device 210 for downloading data and uploading data, software, etc. to and from the data storage unit 208 and CPU 202. Such an input/output device 210 could be a conventional infrared data port, for example, or other standard data transfer technology.

Measurements made by the accelerometers 206 and gyroscopes 204 can be processed by CPU 202, and raw and processed data may be stored in data storage unit 208. As will be described in more detail below, techniques may be used to reduce power consumption within the device 200. Also, as will be described in more detail below, measured velocity, acceleration or change in angle rate, are used to determine when driving movements occur. Therefore, sensor 200 is configured to extract from the measured data the overall velocity and acceleration of the vehicle as well as the individual sensors in relation to the vehicle.

Preferably, each sensor 102,104 in the LSES™ is outfitted with appropriate RF protection (not shown) to prevent interference from electronic security screening equipment, magnetic fields, tampering, etc. Also, it is preferred that no companion technology is required to be installed in the vehicle (e.g., an interlocking device), that no companion technology be installed in police cruisers, or that the individual would need to wear other sensors than the LSES™. Of course, it is recognized that additional functionality could be performed by such companion technology and therefore, the present invention is not meant to be limited. Since the present invention does not require additional equipment or infrastructure, it will be less costly to administer.

The LSES™ preferably is configured to determine if an individual is operating a motor vehicle by analyzing data measured by wrist mounted sensors 102 and/or ankle mounted sensors 104. Therefore, each sensor may be programmed to analyze the sensed data on its own, or alternatively raw data may be stored to be downloaded and analyzed later by an external data processing device. In a preferred embodiment, each sensor includes appropriate software, hardware and/or firmware to perform the analysis. Exemplary algorithms for identifying driving movements are described with reference to FIGS. 3A–B.

According to an embodiment of the present invention, the driving detection algorithm for the ankle and wrist mounted modes can be summarized as follows:

When the sensors detect vibration of an appropriate frequency of amplitude greater than established thresholds, the sensor will switch from the power saving idle mode to the full operational driving detection mode.

When the sensors detect the foot to gas/brake pedal "signatures" in correlation with acceleration/deceleration and or turns of the vehicle, the sensor will write to memory the date and time of driving and associated kinematic data.

When the sensors detect the distinctive left and right-arcing motions of the hands turning the steering wheel with the corresponding subsequent left and right turns of the vehicle, the sensor will write to memory the date and time of confirmed driving and associated kinematic data.

Figure 3A:
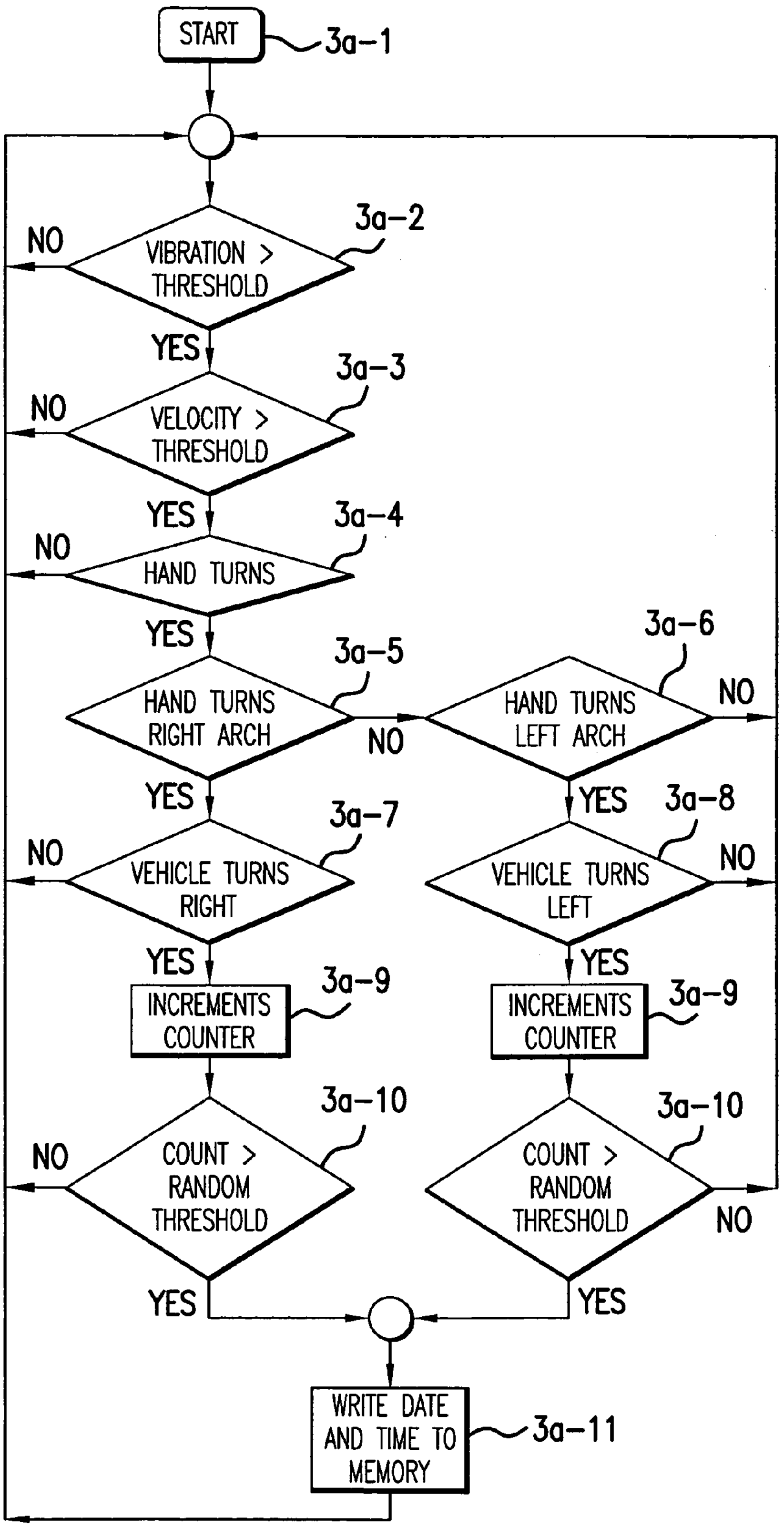
FIGS. 3A and 3B are flow charts of a wrist mounted algorithm and an ankle mounted algorithm, respectively, according to an embodiment of the present invention.

FIG. 3A is a flow chart of an exemplary algorithm for a wrist mounted sensor. Processing begins at step 3a-1 and proceeds to step 3a-2 where a level vibration is measured and compared to a predetermined threshold value. If the predetermined threshold value for vibration is met, processing proceeds to step3a-3. Here, velocity of the sensor is measured and compared against a predetermined threshold value. If the measured velocity exceeds predetermined threshold value, then processing proceeds to step 3a-4, where a hand turn algorithm is executed to determine whether there has been a hand turn based on measurements made by the wrist sensor. If a hand turn has been determined, then processing proceeds to step 3a-5. At this step, it is determined whether the hand turns right and if not, then at step 3a-6 it is determined whether the hand turns left. If it is determined that the hand turns right at step 3a-5, then it is next determined whether the vehicle turns right at step 3a-7. Otherwise if it was determined that the hands turned left at step 3a-6, then at step 3a-8 it is determined if the vehicle turns left. If at steps 3a-7 or 3a-8 it is determined that a turn was made, then processing proceeds to step 3a-9.

At step 3a-9, a counter is incremented, and then at step 3a-10, it is determined whether the counter is greater than a prescribed threshold value. The prescribed threshold value is used to eliminate correlations between the small movements of a passenger's hand and foot and the movement of a vehicle. If the counter exceeds the prescribed threshold value, then at step 3a-11, information is written in the memory such as date and time driving was determined plus associated kinematic data. If any of the preceding steps were answered in the negative (except 3a-5), then processing returns to the beginning and the process is repeated. Similarly, after information is written to memory, the processing is repeated to detect further driving movements.

Figure 5:
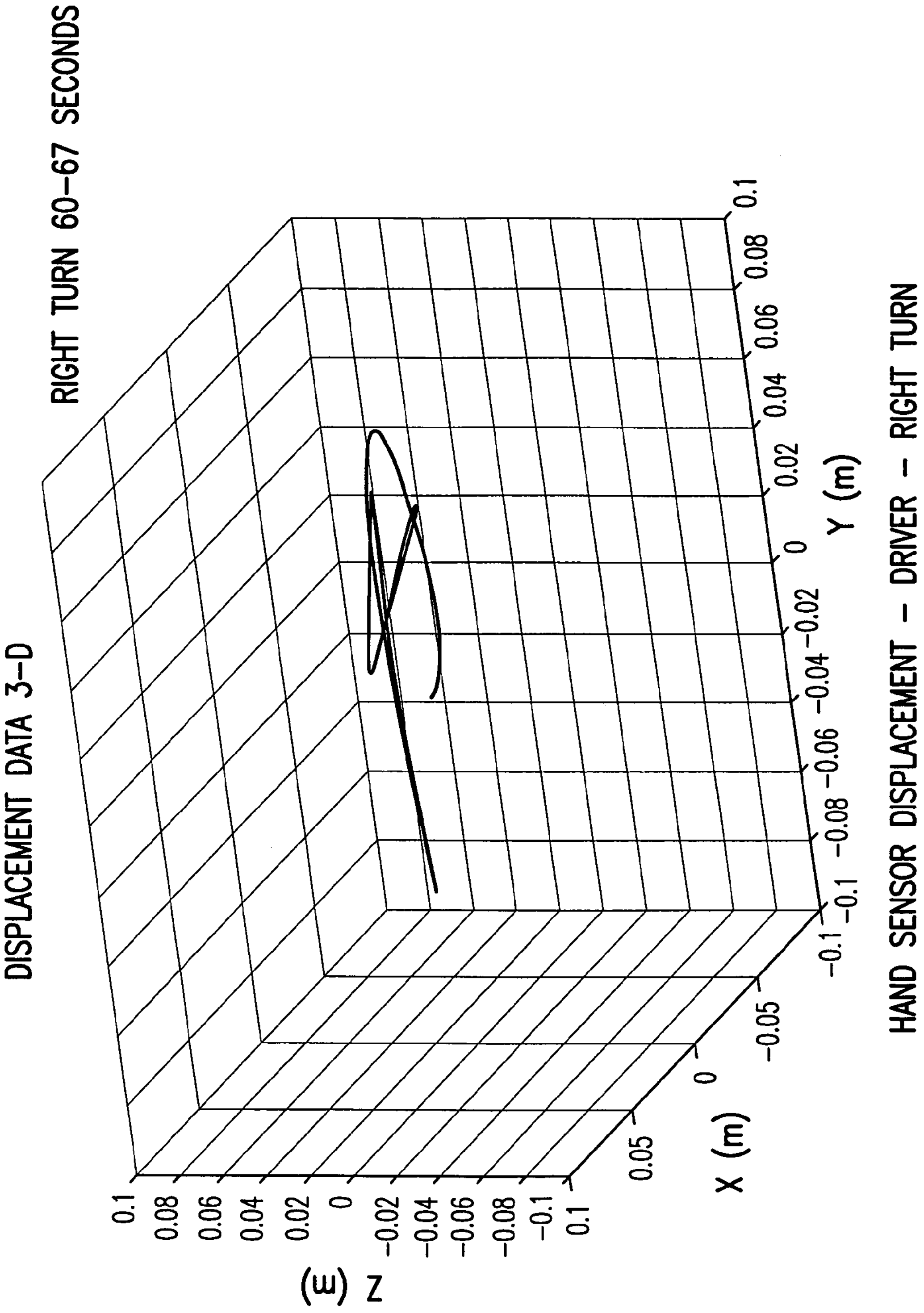
FIGS. 5 through 14B are graphs of test data demonstrating correlations that can be made between measured movements (i.e., angle and acceleration of ankle and wrist sensors) for the purpose of determining driving moments, according to an embodiment of the present invention.
Figure 6:
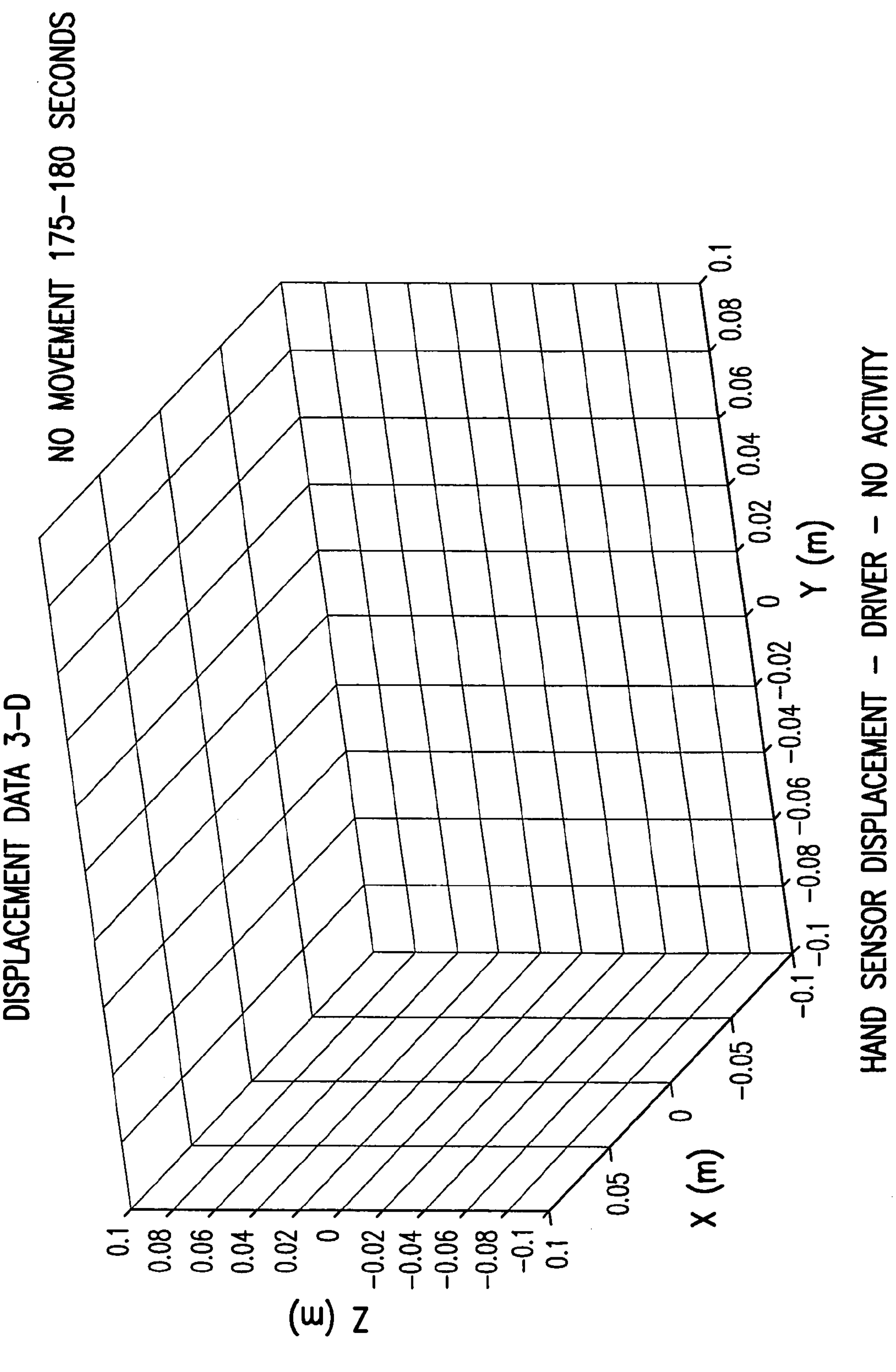
Figure 7:
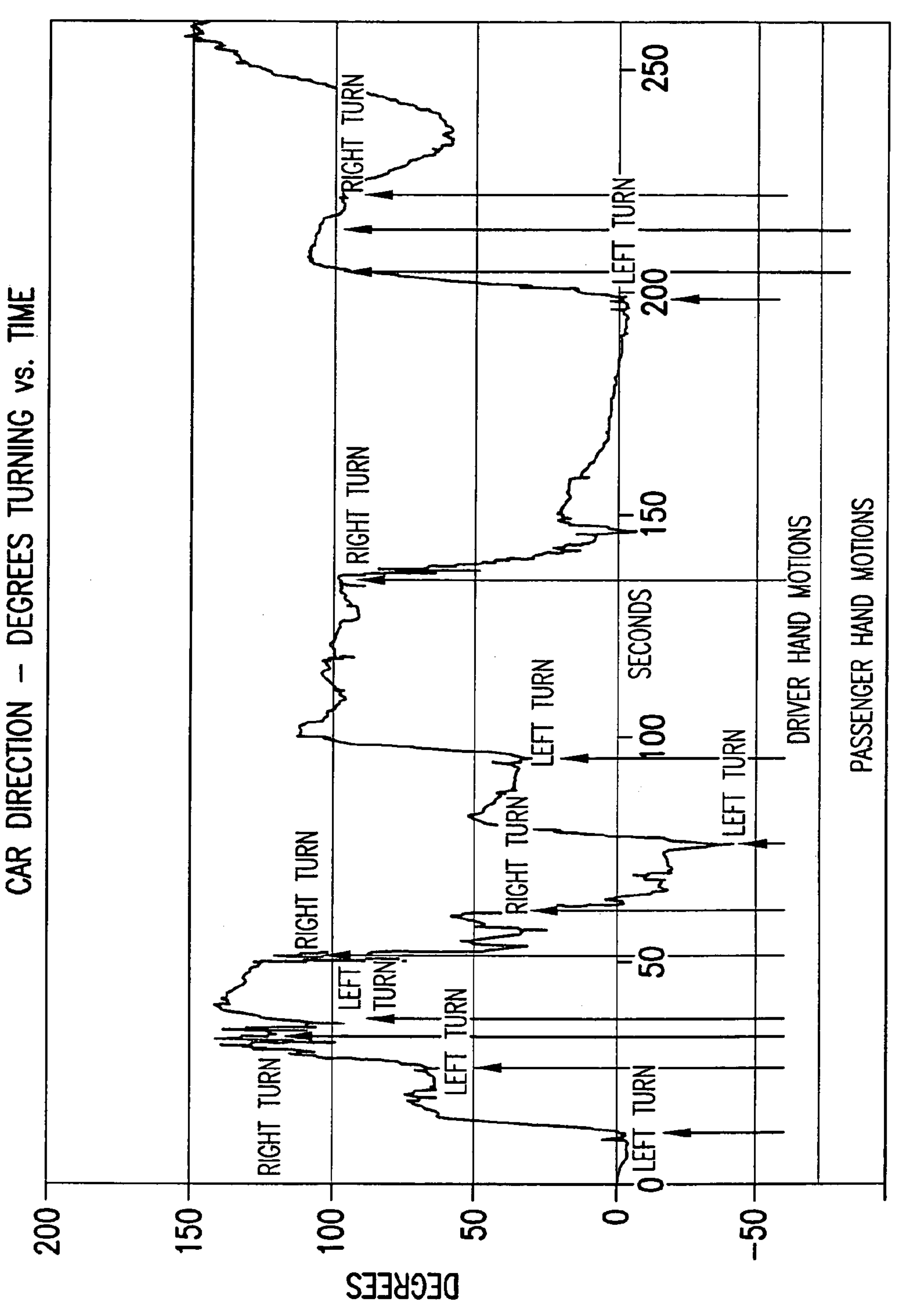
Figure 8A:
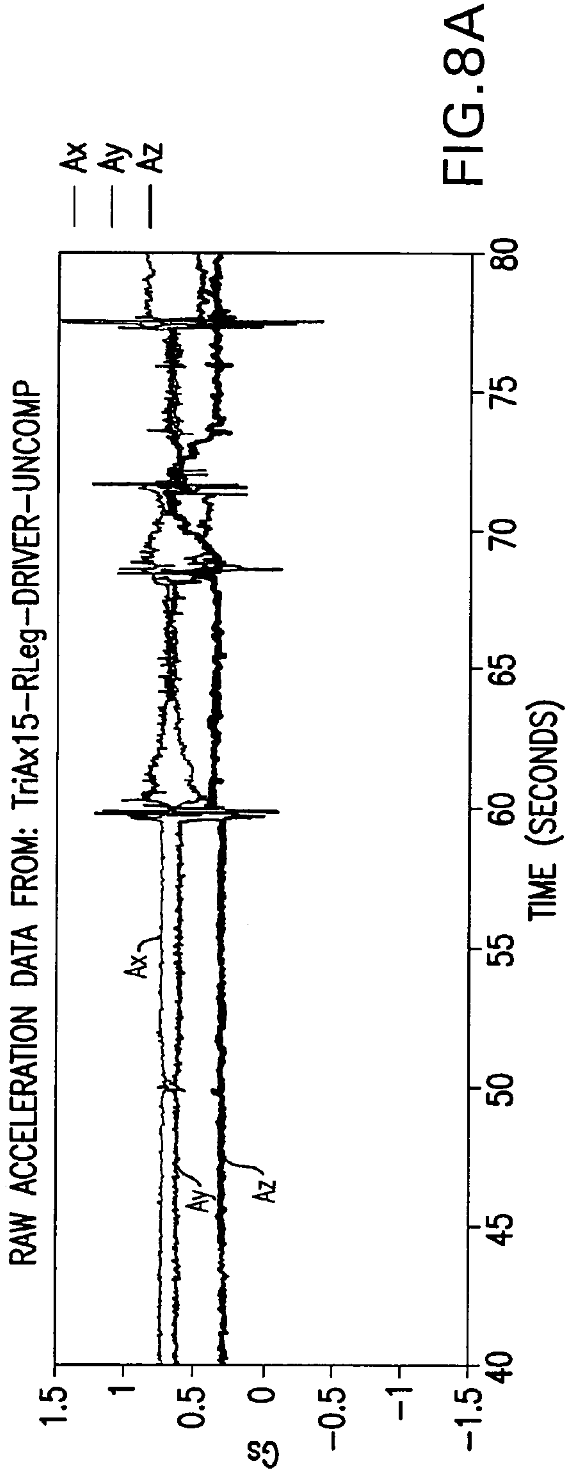
Figure 8B:
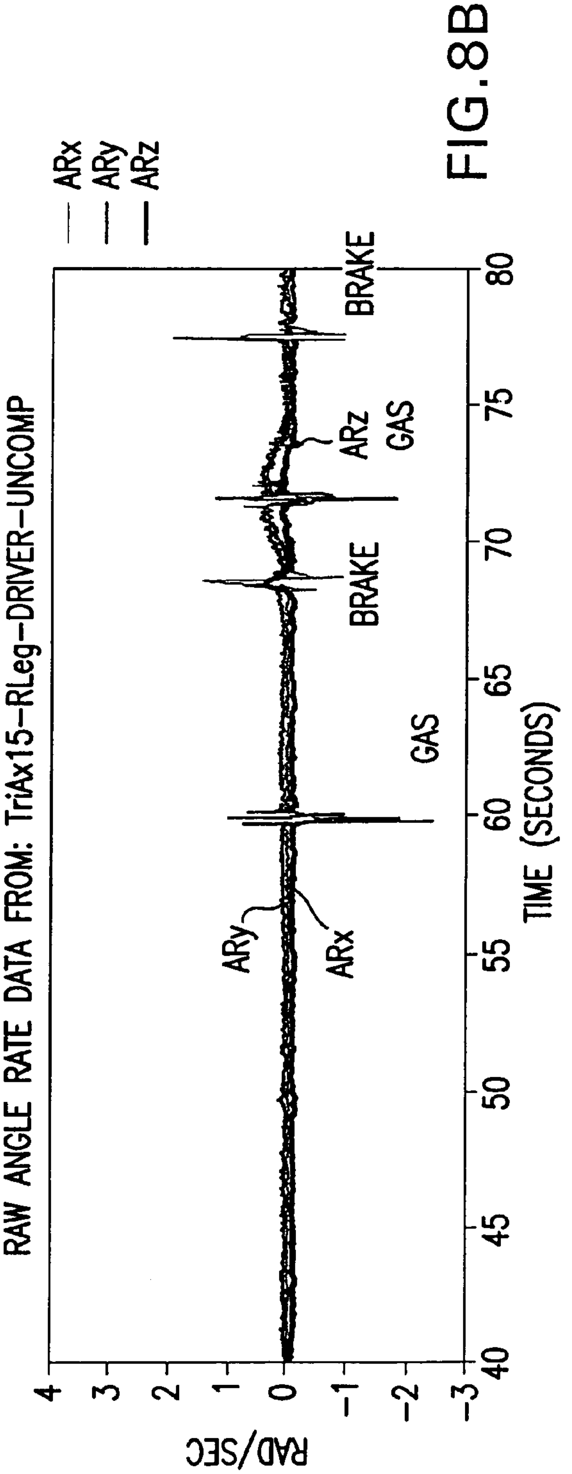
Figure 9A:
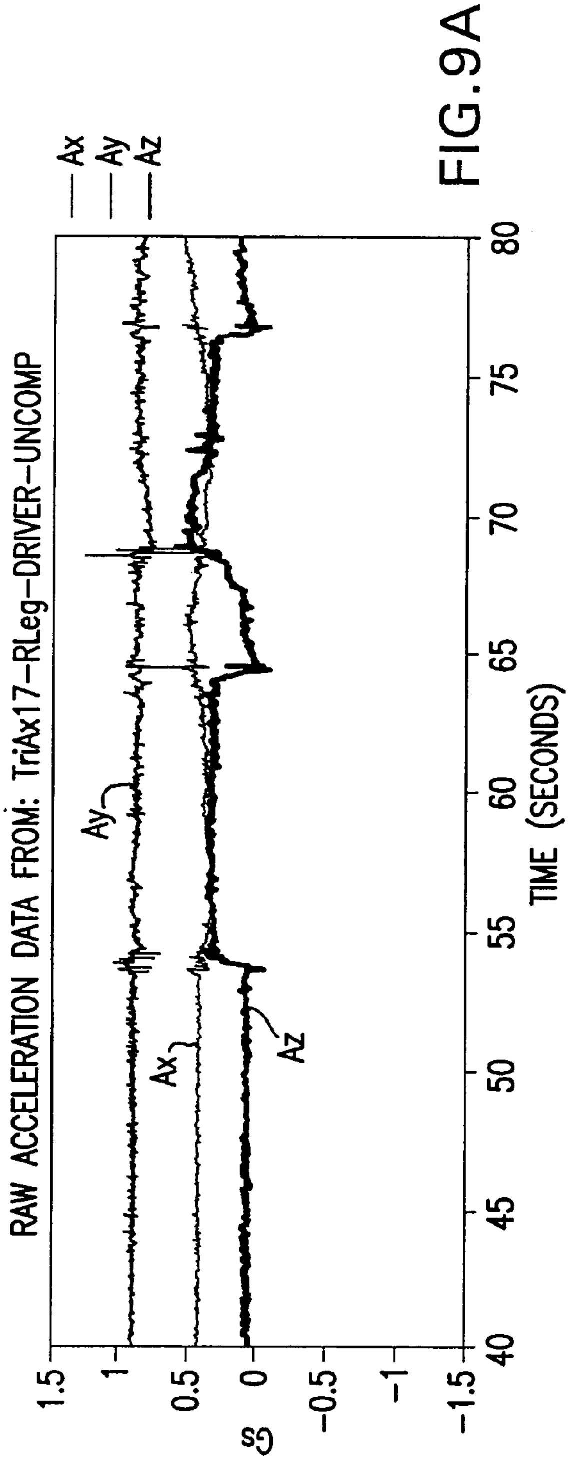
Figure 9B:
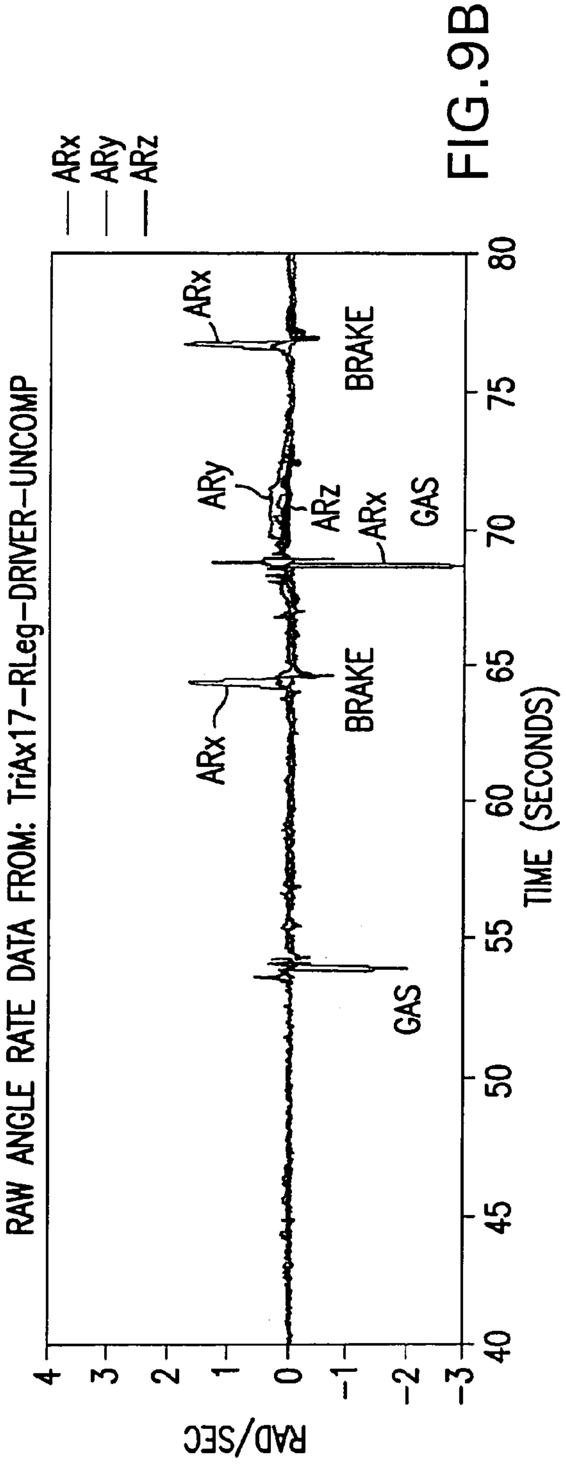

In a wrist mounted mode, the LSES™ can determine whether the offender is driving by identifying from the measured data, defined left and right arcing motions of the hand(s) turning the steering wheel and the corresponding left and right direction change(s) of the vehicle. In an experiment, three-dimensional sensor displacement calculations were performed to isolate and demonstrate that an arcing motion of the hand occurred at known times when the car turned and not at times of no turning activity. FIG. 5 shows the arcing motion in three dimensions that takes place during a right hand turn. FIG. 6 shows the stillness of the sensor at a known quite time. FIG. 7 is a graph of degrees of turning versus time, graphically showing the correlation of driver hand motions to the turning of a car.

In the wrist mounted mode, the present invention can determine when the wearer of the device is not driving (e.g. when a passenger in a vehicle) by the absence of the defined arcing motions associated with turning a steering wheel and the absence of correlation of the right and left direction changes of the vehicle. This is also graphically demonstrated with test data in FIG. 7, which shows a passenger's hand motions that occur at a time that is unrelated to sharp turns of the vehicle, between a left turn and a right turn.

Figure 3B:
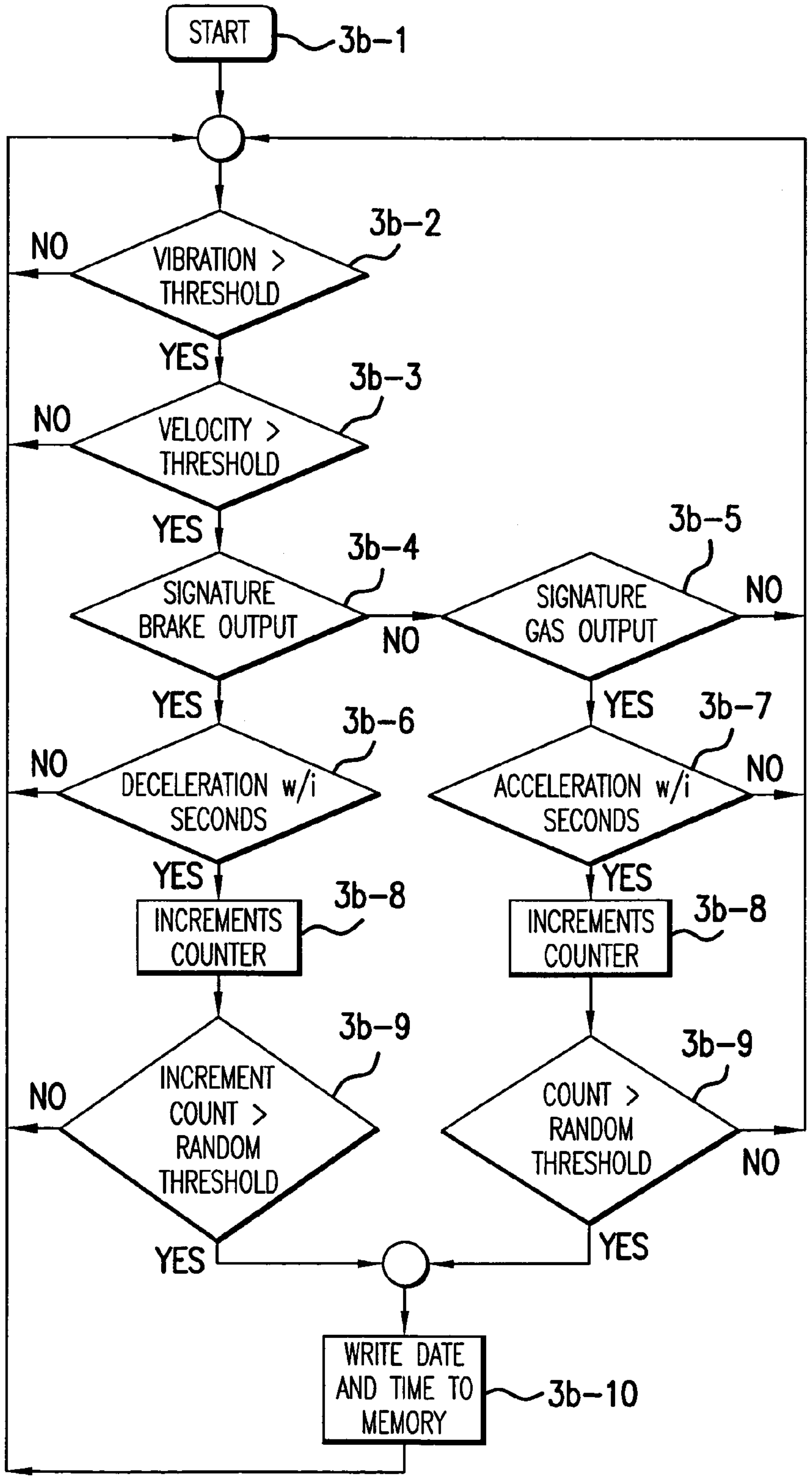

FIG. 3B is a flow chart of an exemplary algorithm for an ankle mounted sensor. Processing begins at step 3b-1 and proceeds to step 3b-2 where a level of vibration is measured and compared to a predetermined threshold value. If the predetermined threshold value for vibration is met, processing proceeds to step 3b-3. Here, velocity is measured and compared against a predetermined threshold value. If the measured velocity exceeds predetermined threshold value, then processing proceeds to step 3b-4, where a signature brake algorithm is executed to determine whether there exists a signature brake movement based on measurements taken by the ankle sensor.

If a brake signature has been determined, then processing proceeds to step 3b-6 to determine if the vehicle is decelerating within a certain amount of time from the detected brake signature. If no brake signature is determined, then at step 3b-5, a signature gas algorithm is executed to determine whether a gas signature is determined based on measurements taken by the ankle sensor. If a gas signature is determined, then at step 3b-7, it is determined whether the vehicle is accelerating within a certain amount of time from the detected gas signature. If either a brake signature or gas signature is determined, then a counter is incremented at step 3b-8, and then compared to a prescribed threshold value at 3b-9. As described above with reference to FIG. 3A, the prescribed threshold value is used to eliminate correlations between the small movements of a passenger's hands and feet and the movement of a vehicle. If the counter exceeds the prescribed threshold value, then at step 3b-10, information is written in the memory, such as date and time driving was determined plus associated kinematic data. If any of the preceding steps were answered in the negative (except for 3a-4), then processing returns to the beginning of the flow and the entire process is repeated. Similarly, after information is written to memory, the processing is repeated to detect further driving.

Referring to FIGS. 8A–B and 9A–B, detection of the "signature" displacement of the foot to the brake and gas pedals, which is pronounced and unavoidable in suburban driving, can be accomplished a number of ways. There are at least two styles of foot pedal action, which can be identified. "Lifting Style" (see FIGS. 8A–B) where the driver lifts the foot off of one pedal and onto the other, and the "Pivot Style" (see FIGS. 9A–B) where the driver pivots or rotates the foot to and from each pedal.

Acceleration changes can be detected in the ankle sensors 104 to identify displacement of the foot to the brake and gas pedals, for example, when one to three positive and negative spikes on all axes—X,Y, and Z axes—are measured in an ankle mounted sensor 104 within 1 second. The magnitude of these spikes is usually within the range from 0.5–1.0 Gs.

The rate of change in the measured angle also may be used for sensing the signature. For "lifting style" movements, usually 1–2 spikes are measured on the X axis (ARx) ranging from 1–2 rads/sec predominantly in the negative direction for movement to the gas pedal and in the positive direction for movement to the brake pedal. However, there is sometimes measured a return spike of equal magnitude. Smaller spikes are measured on the Y and Z axes (ARy, ARz) up to 0.5 rads/sec, again in the negative direction for movement to the gas pedal and positive for movement to the brake pedal. Angle rate data shows a more distinctive pattern for gas and brake pedal movements than the acceleration data.

For "pivot style" movements, a single spike is measured on the X axis (ARx on FIG. 9B)) ranging from 2–3 rads/sec in the negative direction for movement to the gas pedal and positive for movement to the brake pedal. There are smaller spikes measured on the Y and Z axes (ARy, ARz) up to 0.5 rads/sec, again in the negative direction for movement to the gas pedal and positive for movement to the brake pedal.

Figure 10A:
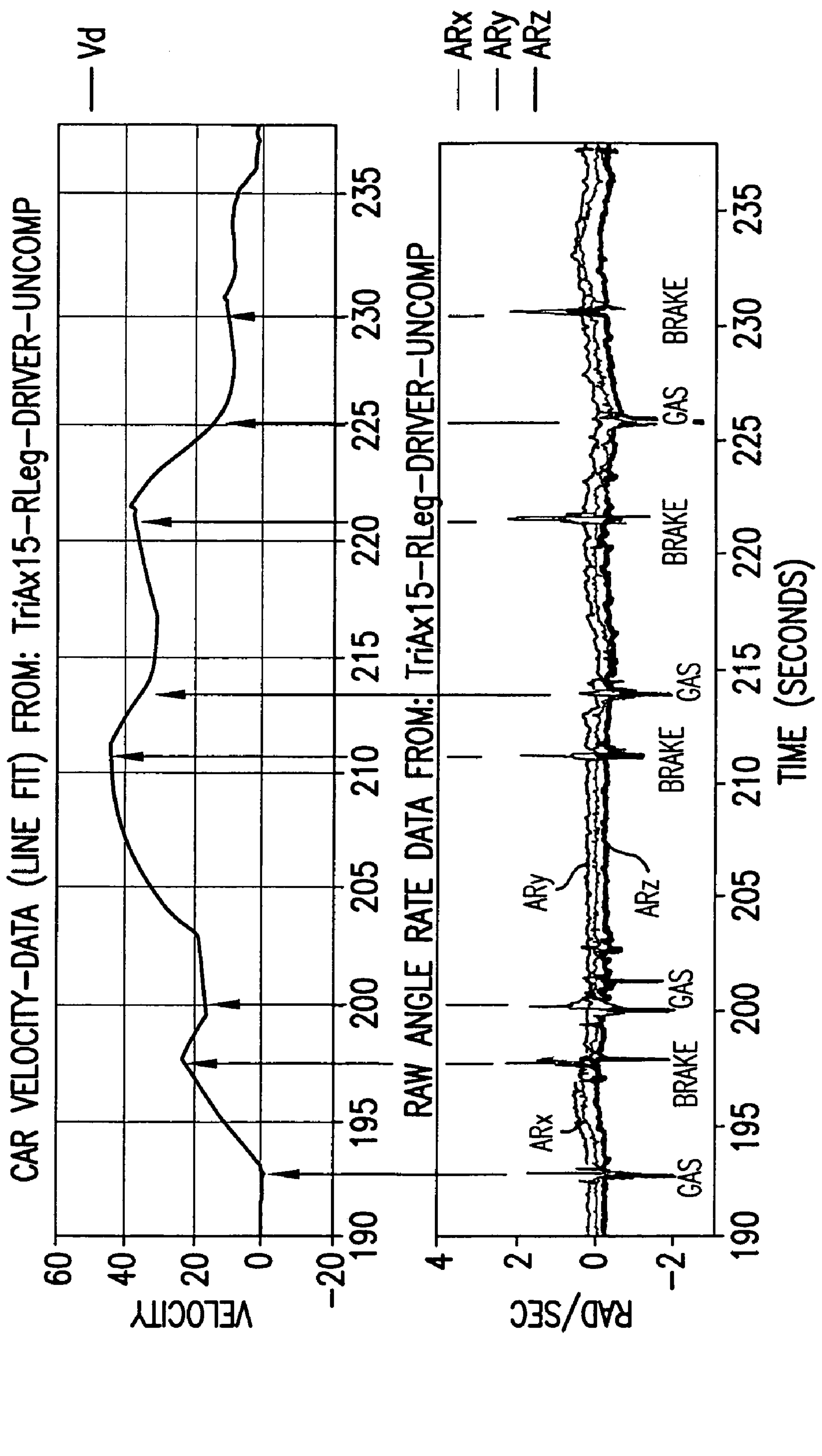
Figure 10B:
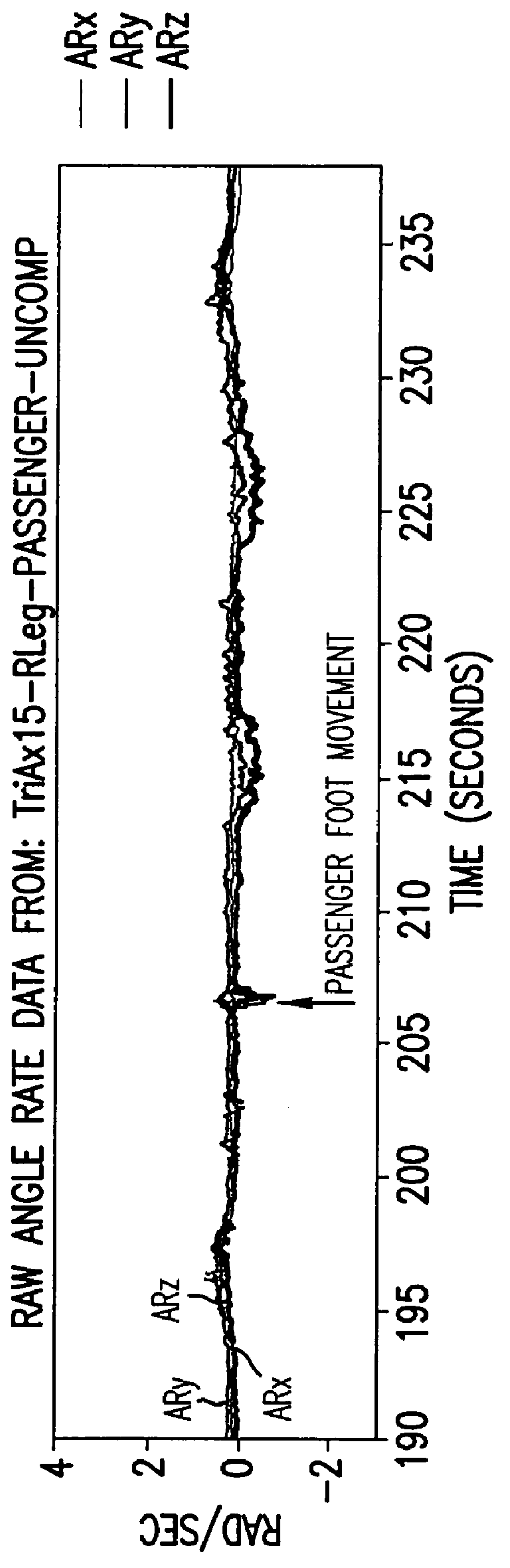

Driving may also be detected through correlation of these gas and brake pedal movements with the measured acceleration/deceleration of the vehicle and the resulting increase/decrease in velocity of the vehicle. This correlation of sensed data is graphically demonstrated with test data in FIGS. 10A–B, showing a strong correlation for a driver wearing the sensor device and weak or no correlation for a passenger wearing the sensor device.

Figure 11A:
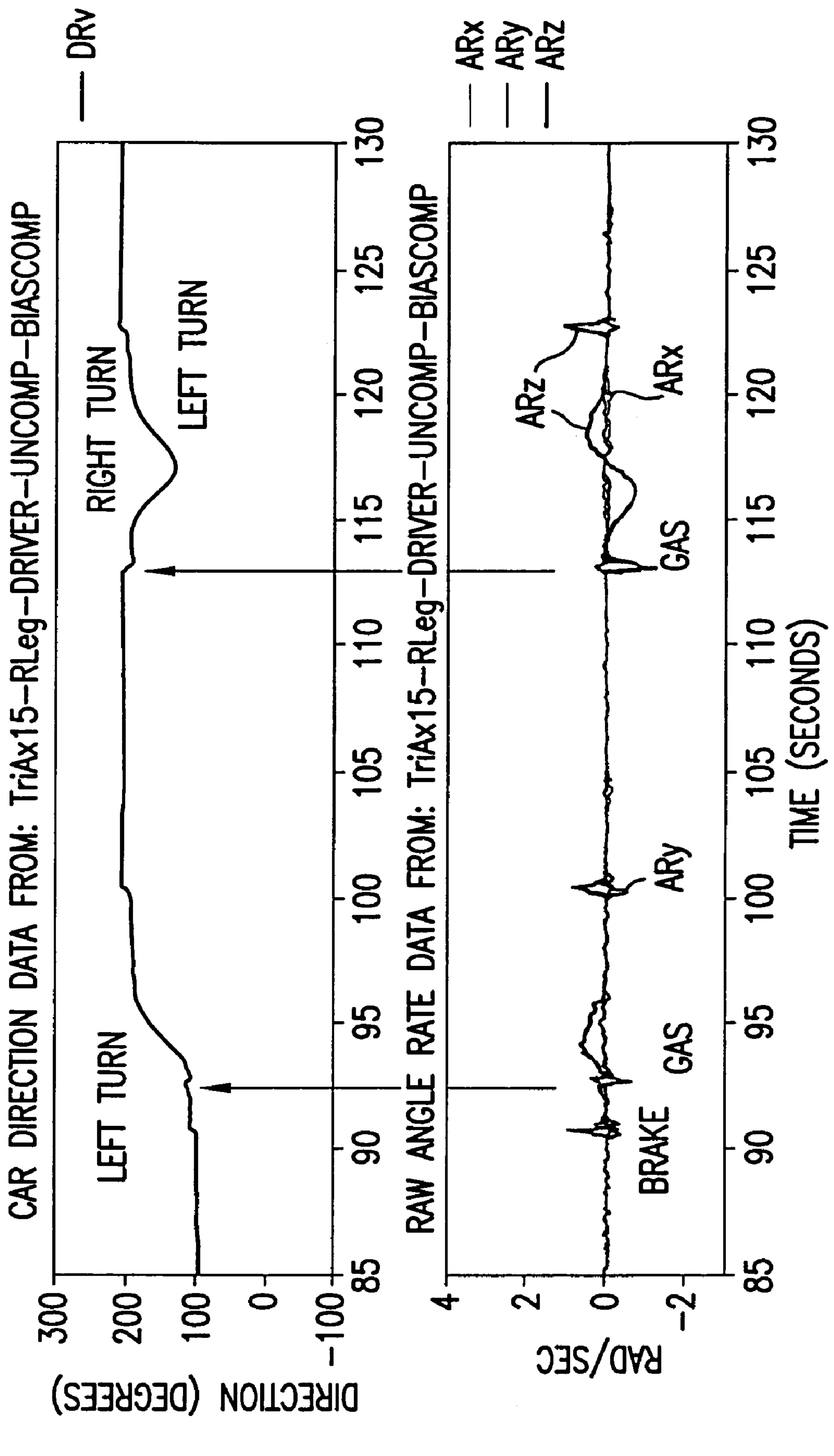
Figure 11B:
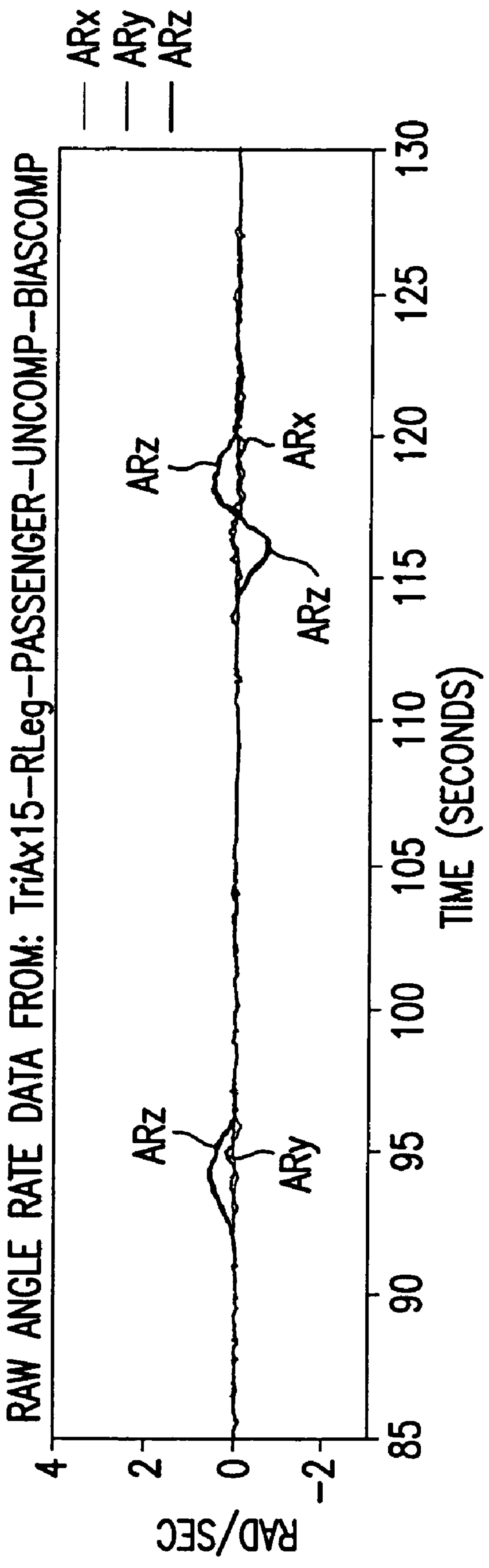
Figure 12A:
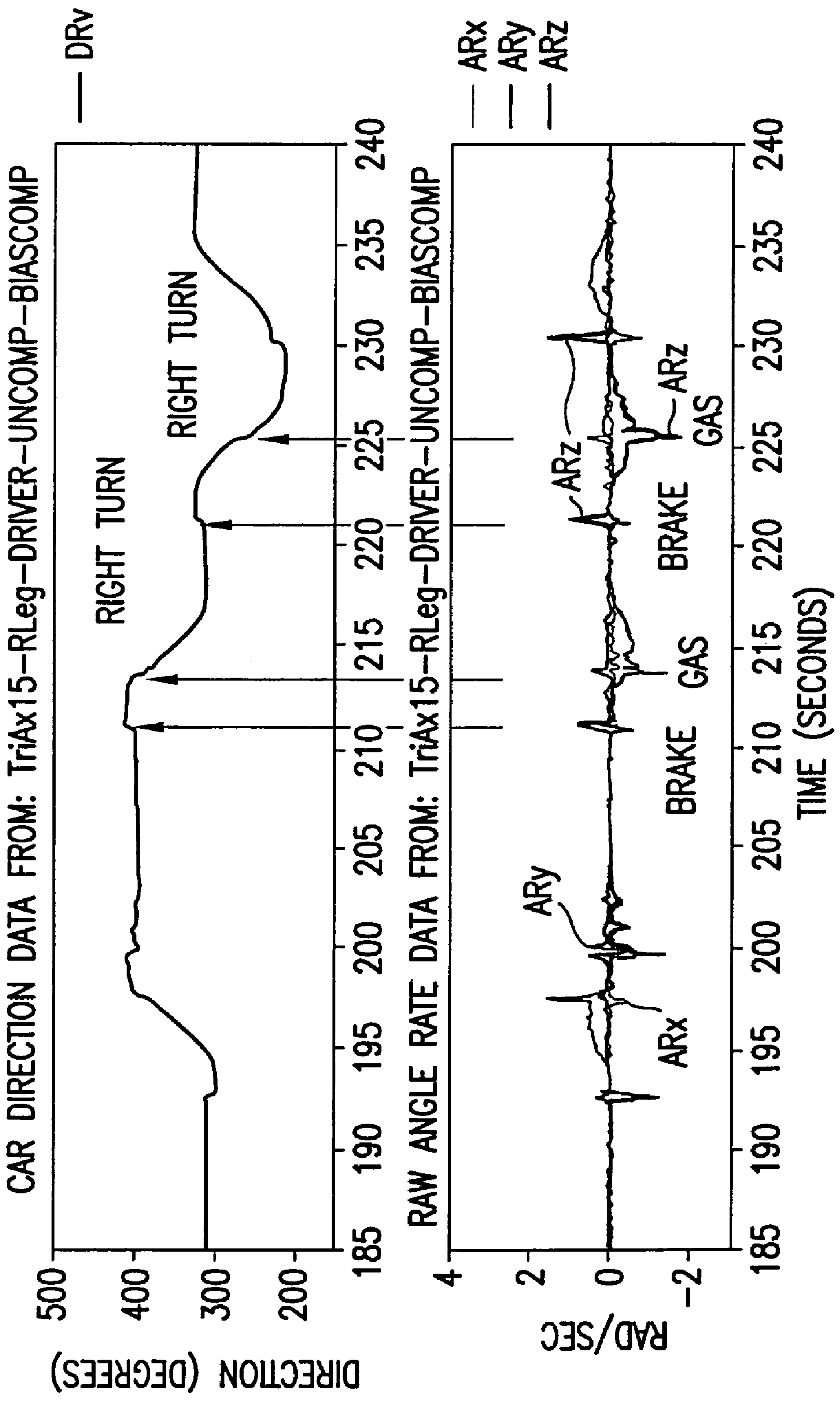
Figure 12B:
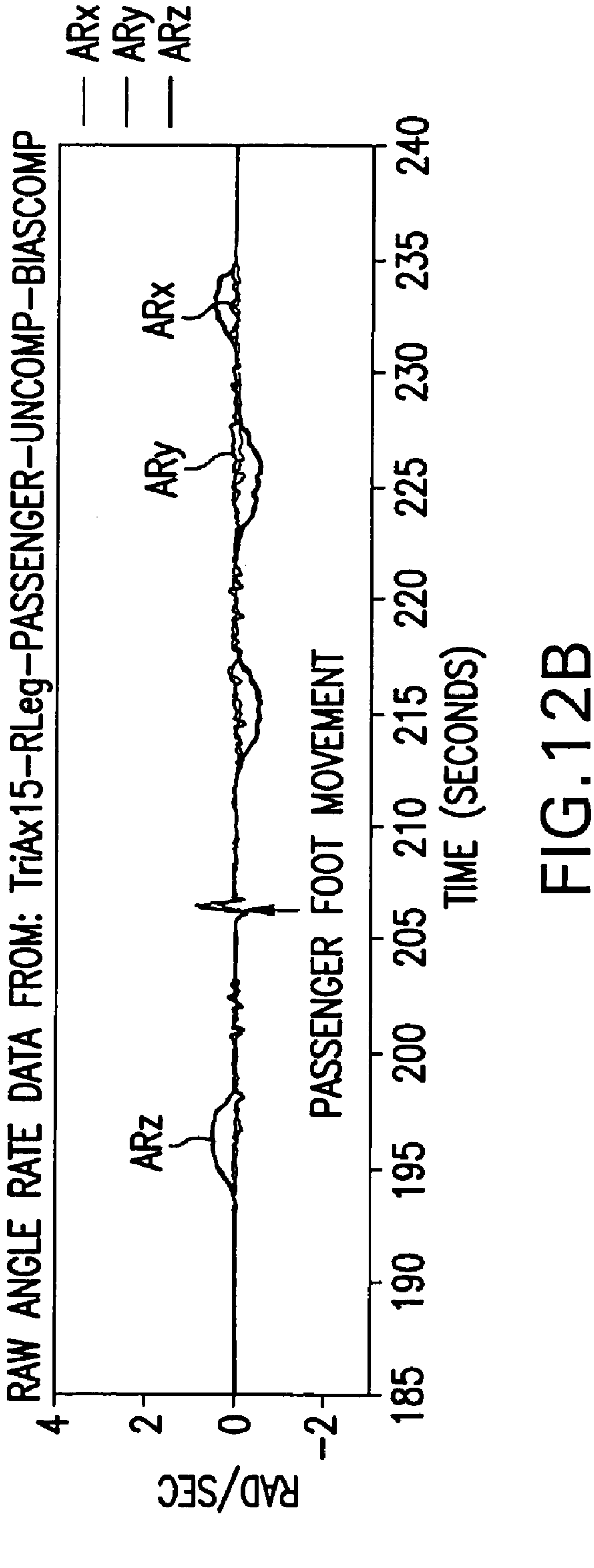
Figure 13A:
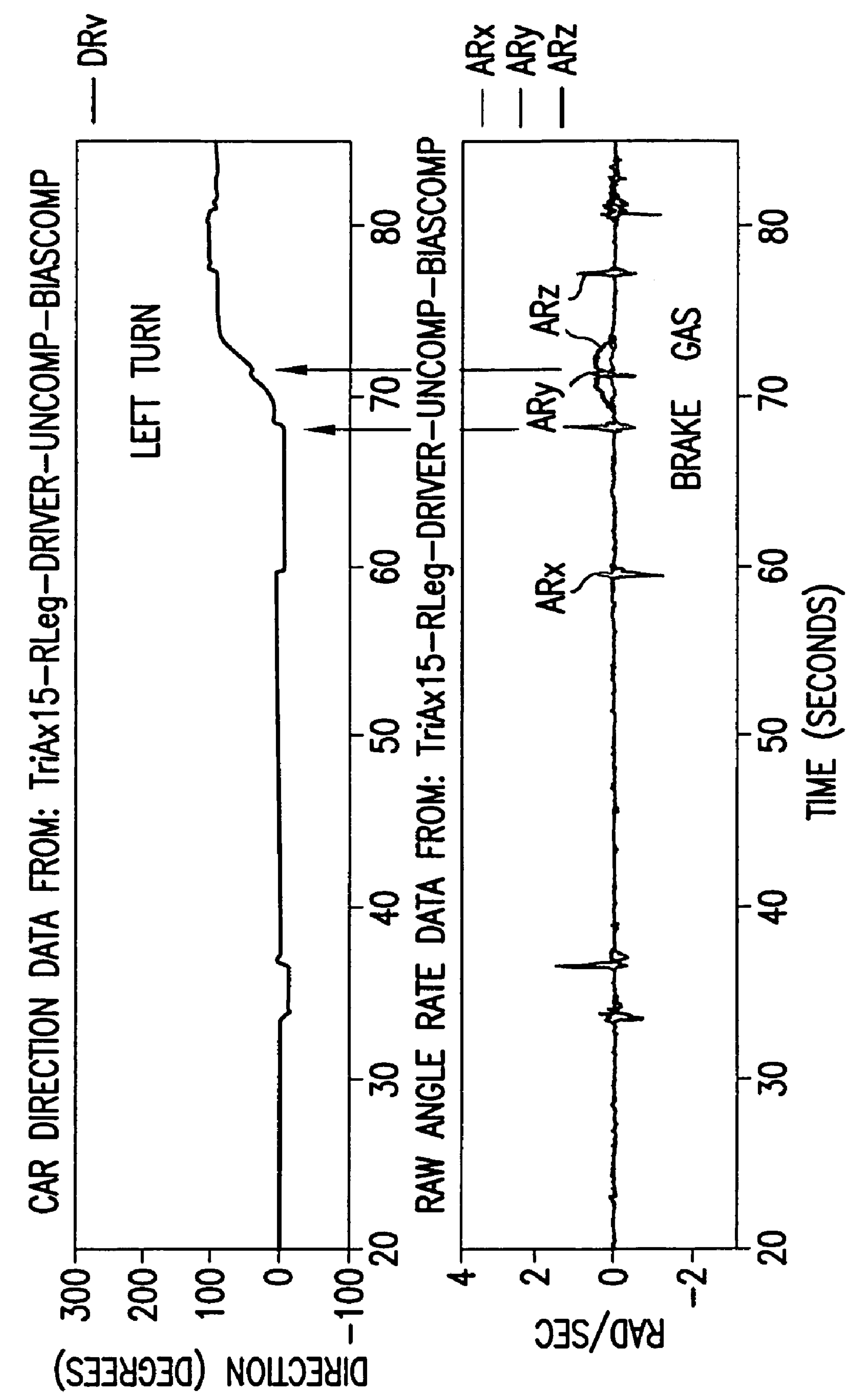
Figure 13B:
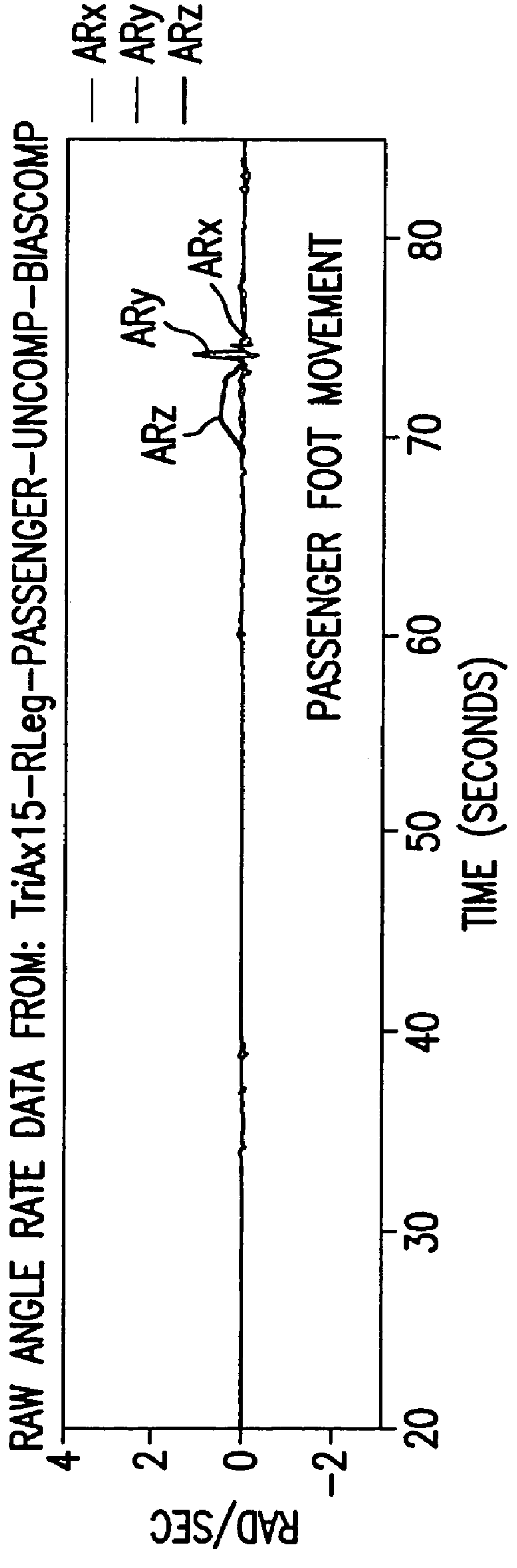

Driving also may be detected when a wearer is making a right or left turn from a stop, by correlating the "signature" displacement of the foot to the gas with the acceleration of the vehicle and right or left turn of the vehicle. This correlation of measured data is graphically demonstrated with test data in FIGS. 11A–B, which again demonstrates that a passenger sensor device will not develop any spurious signature signal patterns.

When making pronounced right and left turns while underway in suburban driving, the "signature" displacement of the foot to brake, the vehicle turn, and subsequent foot displacement to gas pedal that are very common patterns involved with suburban driving also are capable of being highly correlated. This is graphically demonstrated by test data in FIGS. 12A–13B.

Figure 14A:
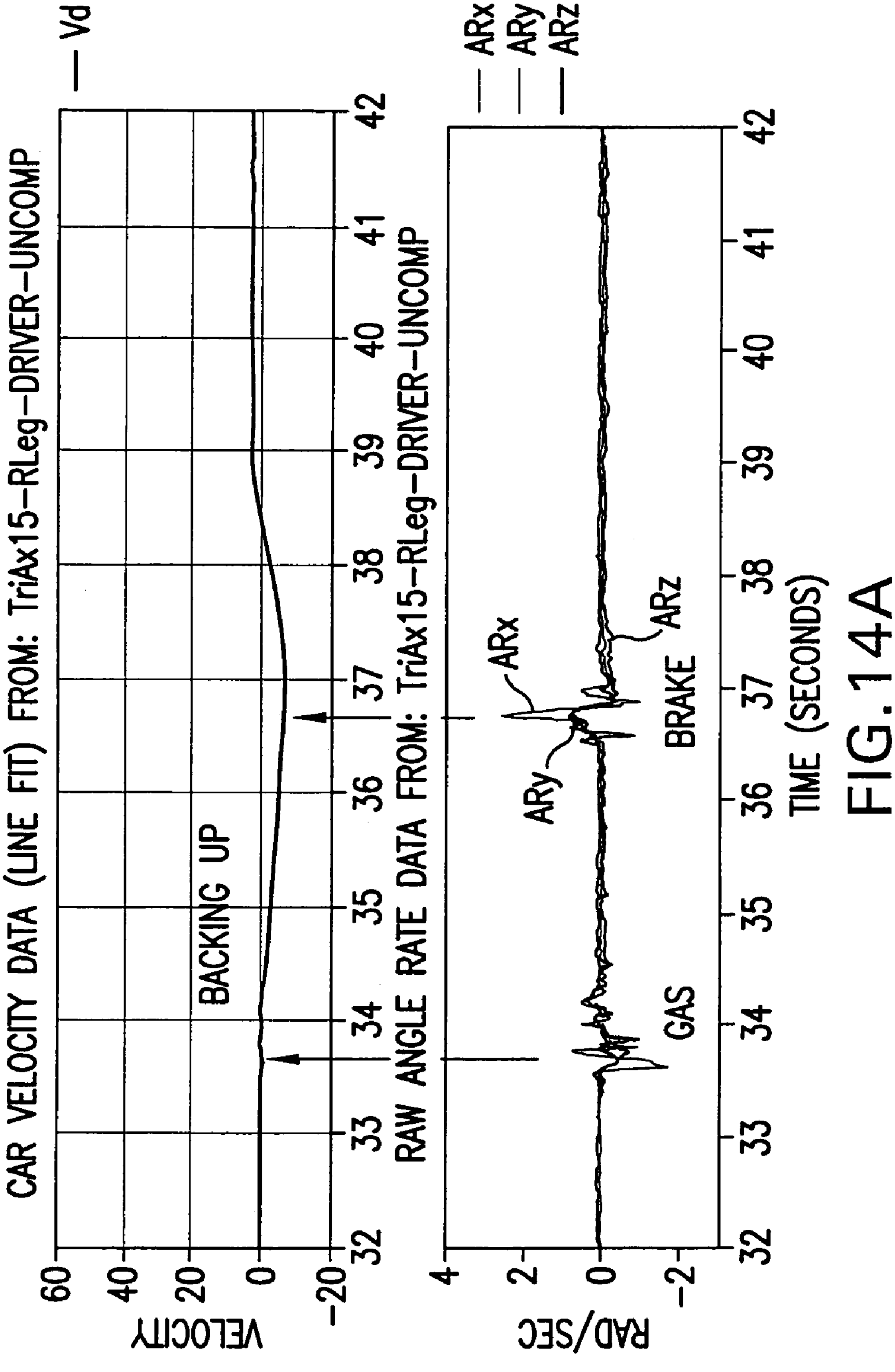
Figure 14B:
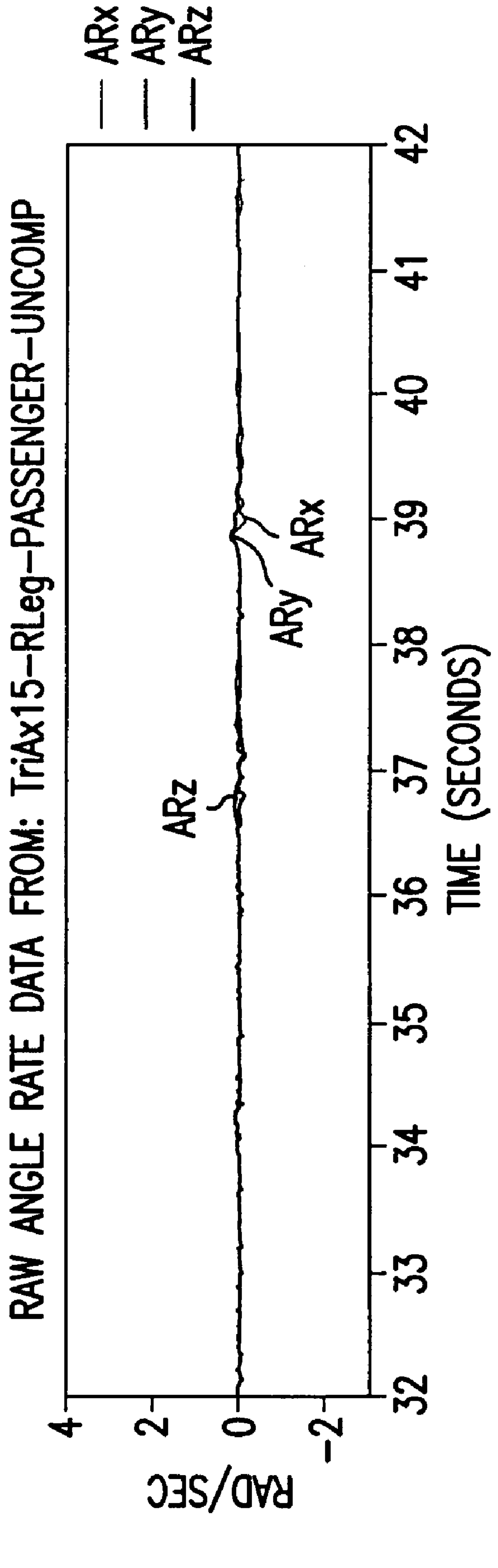

Also, detection may be made when a vehicle is being backed up from standing stops by correlating the "signature" displacement of the foot to the gas pedal and backward acceleration of the vehicle. This backward motion is usually followed by the "signature" displacement of the foot to the brake and deceleration and stopping of the vehicle. This is graphically demonstrated by the test data at FIG. 14-A.

In the ankle mounted mode, the LSES™ can also determine that the individual is not driving by the absence of the "signature" displacement of the feet to and from the gas pedals and the absence of correlation of any displacement of the feet and corresponding acceleration, deceleration and turning of the vehicle. This is graphically demonstrated with test data in FIGS. 11A–14B.

In one embodiment, the sensors are self-contained and will not transmit or receive signals from outside sources. This will reduce the chance of tampering.

The sensors will preferably operate independently of each other and detect the act of driving a motor vehicle on their own accord, which will also reduce the risk that they can be tampered with, since they will determine that an offender is driving by detecting and correlating the most basic hand and foot motions essential to driving with the most basic and fundamental movements of the vehicle. It is not possible to drive a vehicle without turning the steering wheel or stepping on the gas and brake pedals.

In one application of the present invention, individuals who have had their licenses administratively suspended/revoked can wear constantly, by order of a court or as agreed to by the individual in an administrative proceeding, tamper proof sensors on the ankles or the wrists that can detect when the wearer is illegally driving a vehicle. The present invention can record and store the times and dates that the individual has been determined to have illegally operated a motor vehicle. This data can be downloaded at periodic battery servicing times, by wireless mechanisms, or otherwise be provided to the wearer's probation/case officer for appropriate legal and administrative compliance action.

By using the above-described methodology, it has been found that the present invention will work with any type of vehicle being driven (car, truck, etc.) regardless of type of transmission (automatic, standard, etc.) or vehicle age.

The legal precedents for court ordered wrist/ankle mounted sensors for traffic offenders were set many years ago. At the present time court ordered Breath Alcohol Ignition Interlock Devices (BAIIDs) are installed in the vehicles of many drivers convicted of alcohol offenses. The data collected by these BAIIDs is recorded and stored in these devices and is periodically downloaded and provided to the offender's probation/case officer for appropriate action. Thus, the legal precedent for the proposed operational mode of the LSES™ has already been established with BAIIDs.

Figure 4:
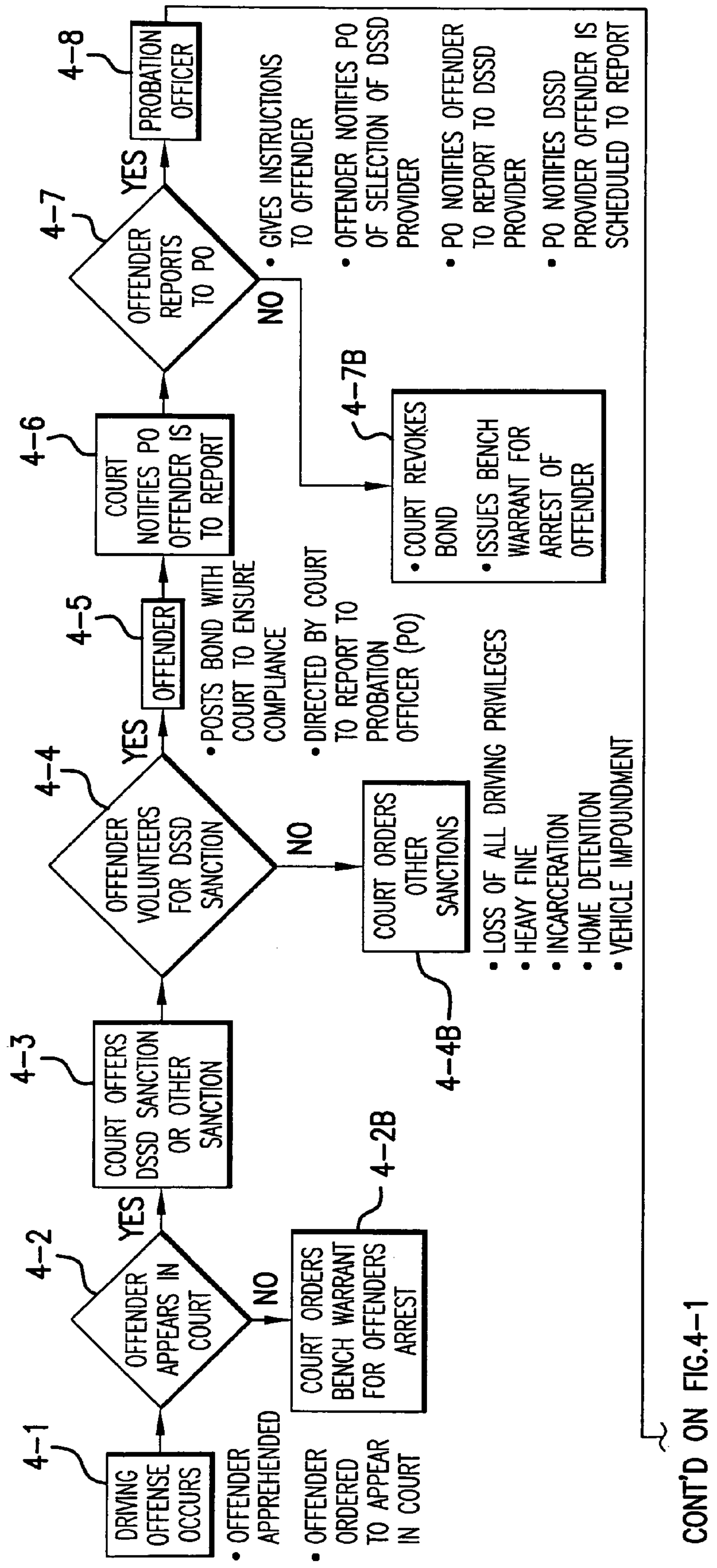
FIG. 4 is a flow chart of a method for implementing the present invention as a compliance sanction for monitoring and controlling license offenders according to an embodiment of the present invention.
Figures 1, 4:
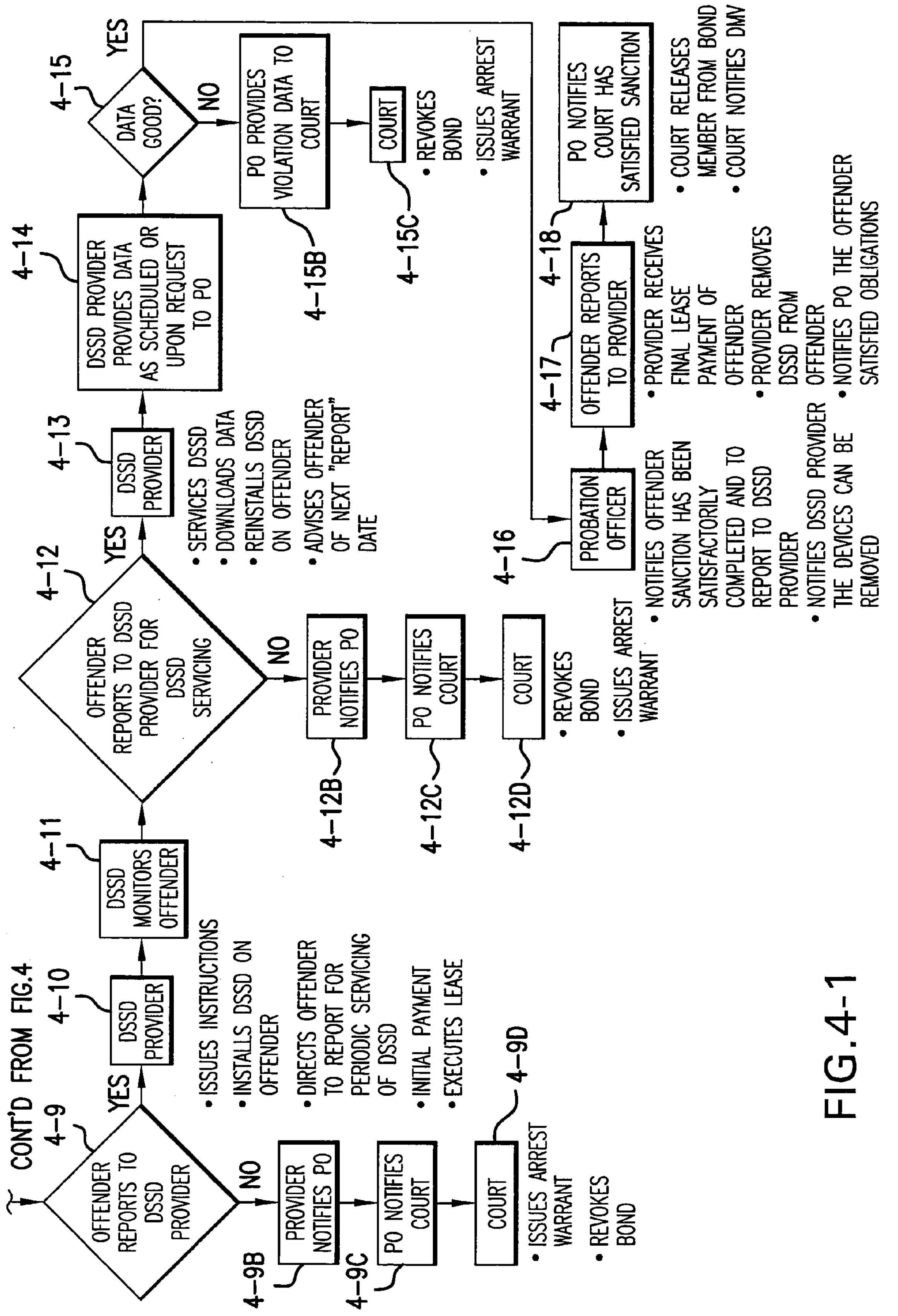

FIG. 4 is a flow chart of a method for using the LSES™ as a compliance sanction that will provide the positive technical solution for monitoring and controlling license offenders. Process begins at step 4-1 when the driver incurs some sort of driving offense, e.g., reckless driving, driving while intoxicated, etc. at some point in time; the offender appears in court (4-2).

If the offender fails to appear in court, the court will order a bench warrant for the offender's arrest (4-2B). Step 4-3; the court can offer LSES™ sanction in lieu of other possible sanctions. If the offender fails to volunteer for LSES™ sanction, then the court could order loss of driving privileges, heavier fines, incarceration, etc., in order to give incentive to offenders to accept a LSES™ sanction. At step 4-5, the offender posts bond with the court to insure compliance with the sanction and is directed by the court to report to probation officer. The probation officer is notified by the court (4-6) and the offender reports to the probation officer (4-7).

Of course, if the offender fails to report to the probation officer, the court can revoke the bond and issue a bench warrant for the offender's arrest (4-7B). Upon report, the probation officer gives instructions to the offender about the probation, and the offender notifies the probation officer of the selection of the LSES™ provider. The probation officer explains the procedure for reporting to the LSES™ provider and notifies the LSES™ provider that the offender is scheduled to report. At step 4-9, the offender reports to the LSES™ provider who issues instructions, installs the LSES™ on the offender, directs the offender to report for periodic servicing of the LSES™, collects payments, executes a lease from the LSES™, etc. (4-10). Of course, if the offender fails to report to the LSES™ provider, the provider can notify the probation officer who can then notify the court who then can revoke the bond and issue a bench warrant for the arrest of the defendant (4-9B-D).

At this point, the LSES™ has been installed and the monitoring process begins. Periodically, the offender will report to the LSES™ provider for LSES™ servicing (4-12). At this point, the LSES™ provider can service the LSES™ and download monitoring data. The LSES™ can be reinstalled on the offender and the next report date can be assigned to the defender.

Of course if the offender fails to report for servicing, the provider can forward this notice to the probation officer and revoke the probation (4-12B-D).

The LSES™ provider can provide the downloaded data by any means necessary, such as paper or electronic form. The data may be provided in a raw format or may be processed and/or analyzed. At step 4-15, it is determined whether or not the offender has complied with his probation (i.e., has not operated a motor vehicle). This report may be provided to the probation officer 4-16 who can then provide the information to the court. If the data determines that the offender has illegally operated a motor vehicle, probation officer may notify the court which "may revoke the bond and issue an arrest warrant (4-15B-C)."

The monitoring may continue until the sanction is completely satisfied, at which point the offender will report to the provider (4-17) who removes the LSES™ form the defendant.

Accordingly, the LSES™ may be used as an effective device for ensuring compliance with court sanctions, probation, etc. It should be noted that FIG. 4 is merely exemplary and that the present invention is not meant to be limited to this embodiment.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention.

For example, Global Positioning Satellite (GPS) technology could be incorporated into the LSES™. This would allow law enforcement officers to track and arrest license offenders while they are driving. Signal transmitters could also be incorporated into the LSES™ to signal to roadside police cruisers that a license offender is passing by.

The present invention may be configured to allow the offender/wearer to drive at specified times, such as to go to and from work and to worship. The system could continue to collect the driving data at this time and mark it as permitted, or may simply ignore driving during permitted times. This will allow the courts to be flexible in the administration of license sanctions that other technologies do not permit.

An alcohol sensor could be incorporated into the present invention to determine and record the fact that the individual was not only illegally driving, but also driving with the presence of alcohol in his/her system.

Signal transmitters could be incorporated into the present invention that would transmit signals to current traffic intersection photo recorders to photograph the license of the offender while driving.

Indication means, such as beeping or vibrating, could be incorporated into the present invention to alert the wearer of the device that the device is detecting driving, which might motivate the individual to immediately stop driving.

Signaling technology could be incorporated into the present invention to transmit signals to toll booths to deny passage, which would make transit difficult by alerting authorities to the illegal driving.

We claim:

1. A device for determining whether an individual has operated a motor vehicle, comprising:

at least one sensor worn by an individual to be monitored, said at least one sensor detecting at least one of directional angular velocity and linear acceleration along three orthogonal axes of an object to which it is mounted; and a data storage unit operationally coupled with said at least one sensor and storing said kinematic data detected by said at least one sensor;

wherein it is determined whether said individual has operated a motor vehicle based upon analysis of said kinematic data stored in said data storage unit.

2. The device as recited in claim 1, wherein said at least one sensor comprises at least one of a gyroscope and an accelerometer.

3. The device as recited in claim 1, wherein said at least one sensor is configured to detect at least one of acceleration and angle, each in three different directions.

4. The device as recited in claim 1, wherein said at least one sensor comprises at least one of a set of three orthogonal accelerometers and a set of three orthogonal rate gyroscopes.

5. The device as recited in claim 1, wherein said device is configured to determine whether said individual is performing driving movements by comparing acceleration measurements with velocity measurements.

6. The device as recited in claim 3, wherein said device is configured to determine whether said individual is performing driving movements by comparing acceleration measurements with velocity measurements.

7. The device as recited in claim 6, wherein said device is configured to determine when said individual is performing a braking movement by comparing a detected movement of a foot of said individual with a detected deceleration of said vehicle.

8. The device as recited in claim 6, wherein said device is configured to determine when said individual is performing a gas pedal movement by comparing a detected movement of a foot of said individual with a detected acceleration of said vehicle.

9. The device as recited in claim 6, wherein said device is configured to determine when said individual is performing a turning movement by comparing a detected movement of a hand of said individual with a detected change in direction of said vehicle.

10. The device as recited in claim 9, wherein said device is configured to determine when said individual is performing a left turn movement by comparing a detected rotational movement of a hand of said individual with a detected change in direction to the left of said vehicle.

11. The device as recited in claim 9, wherein said device is configured to determine when said individual is performing a right turn movement by comparing a detected rotational movement of a hand of said individual with a detected change in direction to the right of said vehicle.

12. The device as recited in claim 9, wherein said device is configured to determine when said individual is performing said turning movement further based on detected foot movements of said individual.

13. The device as recited in claim 12, wherein said device is configured to determine when said individual is performing said turning movement by comparing the detected rotational movement of a hand of said individual with a detected change in direction to the left of said vehicle and with a detected braking movement and a detected gas movement.

14. The device as recited in claim 1, further comprising an input/output unit coupled with said data storage unit, said input/output unit configured to transmit data stored in said data storage unit to an external data processing device.

15. The device as recited in claim 13, further comprising an input/output unit coupled with said memory storage unit, said input/output unit configured to transmit data stored in said memory storage unit.

16. The device as recited in claim 14, wherein said input/output unit comprises an infrared transceiver or similar data transfer technology.

17. The device as recited in claim 15, wherein said input/output unit comprises an infrared transceiver or similar data transfer technology.

18. A device for determining whether an individual has operated a motor vehicle, comprising:

sensing means for measuring directional angular orientation and acceleration motion of at least a body part of an individual; and data storage means for storing said kinematic data measured by said sensing means;

wherein it is determined whether said individual has operated a motor vehicle based upon analysis of the kinematic data stored in said data storage means.

19. The device as recited in claim 18, wherein said sensing means measures directional angle and acceleration in at least three different directions.

20. The device as recited in claim 18, wherein said sensing means comprises at least one of a set of three orthogonal accelerometers and a set of three orthogonal rate gyroscopes.

21. The device as recited in claim 18, further comprising processing means for determining whether said individual is operating a motor vehicle based upon said data measured by said sensing means.

22. The device as recited in claim 21, wherein said processing means determines whether said individual is performing driving movements by comparing acceleration measurements with velocity measurements.

23. The device as recited in claim 22, wherein said processing means determines when said individual is performing a braking movement by comparing a detected movement of a foot of said individual with a detected deceleration of said vehicle.

24. The device as recited in claim 22, wherein said processing means determines when said individual is performing a gas movement by comparing a detected movement of a foot of said individual with a detected acceleration of said vehicle.

25. The device as recited in claim 22, wherein said processing means determines when said individual is performing a turning movement by comparing a detected movement of a hand of said individual with a detected change in direction of said vehicle.

26. The device as recited in claim 22, wherein said processing means determines when said individual is performing a left turn movement by comparing a detected rotational movement of a hand of said individual with a detected change in direction to the left of said vehicle.

27. The device as recited in claim 22, wherein said processing means determines when said individual is performing a right turn movement by comparing a detected rotational movement of a hand of said individual with a detected change in direction to the right of said vehicle.

28. The device as recited in claim 22, wherein said processing means determines when said individual is performing said turning movement further based on detected foot movements of said individual.

29. The device as recited in claim 22, wherein said processing means determines when said individual is performing said turning movement by comparing the detected rotational movement of a hand of said individual with a detected change in direction to the left of said vehicle and with a detected braking movement and a detected gas movement.

30. A method for determining when an individual has operated a motor vehicle, comprising steps of:

measuring directional angular orientation movement and acceleration motion of at least a hand or foot of an individual and converting the measured movement and motion to storable data;

storing said data; and determining whether said individual has operated a motor vehicle based on analysis of said stored kinematic data.

31. The method as recited in claim 30, wherein said measuring step includes measuring at least acceleration and directional angular orientation of a body part of said individual.

32. The method as recited in claim 30, wherein said measuring step includes measuring at least acceleration and directional angular orientation of a body part of said individual, each in three different directions.

33. The method as recited in claim 30, wherein said measuring step includes a step of measuring velocity and said determining step includes a comparison step of comparing acceleration measurements with velocity measurements and determining whether said individual has operated a motor vehicle based on said comparison.

34. The method as recited in claim 33, wherein said measuring step includes a step of detecting movement of a foot of said individual, and said determining step determines that said individual has operated a motor vehicle when a brake pedal movement is detected based on the detected movement of said foot at the same time that deceleration of said vehicle is determined from detected acceleration motion.

35. The method as recited in claim 33, wherein said measuring step includes a step of detecting movement of a foot of said individual, and said determining step includes a step of determining when said individual is performing a gas pedal movement based on said movement of said foot, and determining that said individual has operated a motor vehicle when said detected gas pedal movement corresponds with a determined acceleration of said vehicle based on detected acceleration motion.

36. The method as recited in claim 33, wherein said measuring step includes a step of detecting movement of a hand of said individual, and said determining step includes a step of determining when said individual is performing a turning movement based on said movement of said hand, and determining that said individual is driving when said detected hand movement corresponds with a detected acceleration of said vehicle in a direction of the hand turn.

37. The method as recited in claim 33, wherein said measuring step includes a step of detecting a rotational movement of a hand of said individual, and said determining step includes a step of determining when said individual is performing a left turn movement based on said rotational movement of said hand, and determining that said individual is driving when said detected left turn movement corresponds with a detected change in direction to the left of said vehicle.

38. The method as recited in claim 33, wherein said measuring step includes a step of detecting a rotational movement of a hand of said individual, and said determining step includes a step of determining when said individual is performing a right turn movement based on said rotational movement of said hand, and determining that said individual is driving when said detected right turn movement corresponds with a detected change in direction to the right of said vehicle.

39. The method as recited in claim 33, wherein said measuring step includes a step of detecting a rotational movement of a hand of said individual and detecting a movement of a foot of said individual, and said determining step includes a step of determining when said individual is performing a turn movement based on said rotational movement of said hand, a step of determining a brake movement of said foot based on said movement of said foot, a step of determining a gas movement of said food based on said movement of said foot, and wherein it is determined that said individual is driving when said detected turn movement corresponds with a detected brake movement of said foot followed by a detected gas movement of said foot.

* * * * *